US012700366B2

(12) United States Patent
Park et al.

(10) Patent No.: US 12,700,366 B2
(45) Date of Patent: Aug. 4, 2026

(54) DISPLAY APPARATUS, METHOD OF DRIVING THE SAME AND ELECTRONIC APPARATUS INCLUDING THE SAME

(71) Applicant: SAMSUNG DISPLAY CO., LTD., Yongin-si (KR)

(72) Inventors: Sehyuk Park, Yongin-si (KR); Youngha Sohn, Yongin-si (KR); Jin-Wook Yang, Yongin-si (KR); Donggyu Lee, Yongin-si (KR); Jae-Hyeon Jeon, Yongin-si (KR)

(73) Assignee: SAMSUNG DISPLAY CO., LTD., Yongin-si (KR)

( * ) Notice: Subject to any disclaimer, the term of this patent is extended or adjusted under 35 U.S.C. 154(b) by 0 days.

(21) Appl. No.: 19/060,885

(22) Filed: Feb. 24, 2025

(65) Prior Publication Data

US 2025/0218378 A1 Jul. 3, 2025

Related U.S. Application Data

(63) Continuation of application No. 18/347,168, filed on Jul. 5, 2023, now Pat. No. 12,236,874.

(30) Foreign Application Priority Data

Oct. 26, 2022 (KR) ........................ 10-2022-0139724

(51) Int. Cl.
*G09G 3/3233* (2016.01)

(52) U.S. Cl.
CPC ... *G09G 3/3233* (2013.01); *G09G 2300/0819* (2013.01); *G09G 2300/0842* (2013.01);
(Continued)

(58) Field of Classification Search
CPC ... G09G 3/30–3291; G09G 2300/0819; G09G 2300/0842; G09G 2300/0861;
(Continued)

(56) References Cited

U.S. PATENT DOCUMENTS

2003/0160745 A1 8/2003 Osame
2020/0394978 A1* 12/2020 Lim .................... G09G 3/3688
(Continued)

FOREIGN PATENT DOCUMENTS

KR 10-2017-0076478 7/2017
KR 10-2020-0057204 5/2020
(Continued)

OTHER PUBLICATIONS

Office Action dated Apr. 25, 2024, cited in U.S. Appl. No. 18/347,168.

*Primary Examiner* — Hang Lin
(74) *Attorney, Agent, or Firm* — F. CHAU & ASSOCIATES, LLC

(57) ABSTRACT

A display apparatus includes a display panel, a gate driver, a data driver and an emission driver. The display panel includes a pixel. The gate driver is configured to output a gate signal to the pixel. The data driver is configured to output a data voltage to the pixel. The emission driver is configured to output an emission signal to the pixel. The pixel includes a light emitting element, a driving switching element configured to apply a driving current to the light emitting element and a bias switching element configured to apply a bias voltage to the driving switching element. The display apparatus increases a level of the bias voltage when a duration of a light emission time of the pixel is increased.

20 Claims, 17 Drawing Sheets

(52) U.S. Cl.
CPC ............... *G09G 2300/0861* (2013.01); *G09G 2310/0262* (2013.01); *G09G 2310/08* (2013.01); *G09G 2320/0233* (2013.01); *G09G 2320/0247* (2013.01)

(58) Field of Classification Search
CPC ....... G09G 2310/0262; G09G 2310/08; G09G 2320/0233; G09G 2320/0247
See application file for complete search history.

(56) References Cited

U.S. PATENT DOCUMENTS

| | | | | |
|---|---|---|---|---|
| 2021/0035493 | A1 | 2/2021 | Hashimoto | |
| 2022/0335872 | A1* | 10/2022 | Zhang .................. | G09G 3/3233 |
| 2022/0392382 | A1 | 12/2022 | Park et al. | |
| 2023/0178008 | A1 | 6/2023 | Yuan | |
| 2024/0144881 | A1 | 5/2024 | Park et al. | |

FOREIGN PATENT DOCUMENTS

| | | |
|---|---|---|
| KR | 10-2020-0087711 | 7/2020 |
| KR | 10-2021-0055146 | 5/2021 |
| KR | 10-2022-0022335 | 2/2022 |
| KR | 10-2022-0115765 A | 8/2022 |

* cited by examiner

DISPLAY APPARATUS, METHOD OF DRIVING THE SAME AND ELECTRONIC APPARATUS INCLUDING THE SAME

CROSS REFERENCE TO RELATED APPLICATIONS

This U.S. non-provisional patent application is a continuation application of U.S. patent application Ser. No. 18/347,168 filed Jul. 5, 2023, which claims priority under 35 U.S.C. § 119 to Korean Patent Application No. 10-2022-0139724, filed on Oct. 26, 2022, in the Korean Intellectual Property Office KIPO, the contents of which are incorporated by reference in its entirety herein.

1. TECHNICAL FIELD

Embodiments of the present inventive concept relate to a display apparatus, a method of driving the display apparatus and an electronic apparatus including the display apparatus. More particularly, embodiments of the present inventive concept relate to a display apparatus with increased display quality using a variable frequency driving method, a method of driving the display apparatus and an electronic apparatus including the display apparatus.

2. DISCUSSION OF RELATED ART

Generally, a display apparatus includes a display panel and a display panel driver. The display panel includes a plurality of gate lines, a plurality of data lines, a plurality of emission lines and a plurality of pixels. The display panel driver includes a gate driver, a data driver, an emission driver and a driving controller. The gate driver outputs gate signals to the gate lines. The data driver outputs data voltages to the data lines. The emission driver outputs emission signals to the emission lines. The driving controller controls the gate driver, the data driver and the emission driver.

In a display apparatus supporting variable frequency driving, a driving sequence of the display panel may include a writing period and a holding period. A hysteresis characteristic of a driving transistor of a pixel of the display panel in the writing period and a hysteresis characteristic of the driving transistor of the pixel in the holding period are different from each other so that a luminance difference of the display panel may be generated when a driving frequency of the display panel is changed from a high driving frequency to a low driving frequency. Due to the luminance difference, a flicker may be perceivable by a user.

SUMMARY

At least one embodiment of the present inventive concept provides a display apparatus decreasing a luminance difference by adjusting a level of a bias voltage according to a light emission time of a pixel when a driving frequency of a display panel is changed from a high driving frequency to a low driving frequency.

At least one embodiment of the present inventive concept provides a method of driving the display apparatus.

At least one embodiment of the present inventive concept provides an electronic apparatus including the display apparatus.

In an embodiment of a display apparatus according to the present inventive concept, the display apparatus includes a display panel, a gate driver, a data driver and an emission driver. The display panel includes a pixel. The gate driver is configured to output a gate signal to the pixel. The data driver is configured to output a data voltage to the pixel. The emission driver is configured to output an emission signal to the pixel. The pixel includes a light emitting element, a driving switching element configured to apply a driving current to the light emitting element and a bias switching element configured to apply a bias voltage to the driving switching element. The display apparatus increases a level of the bias voltage when a duration of a light emission time of the pixel is increased. For example, when the duration is a first value and the bias voltage is a first voltage during a first period, the display apparatus may increase the bias voltage to a second voltage greater than the first voltage during a second period after the first period when the duration is a second value greater than the first value.

In an embodiment, when a driving frequency of the display panel is changed from a high driving frequency to a low driving frequency, the bias voltage of a first low frequency frame having the low driving frequency may be equal to or greater than the bias voltage of a high frequency frame having the high driving frequency.

In an embodiment, the first low frequency frame may include a first light emission time of a first duration and a second light emission time of a second duration greater than the first duration. The bias voltage in the second duration may be greater than the bias voltage in the first duration.

In an embodiment, the display apparatus may gradually increase the bias voltage toward a first target value in the first duration.

In an embodiment, the display apparatus may gradually increase the bias voltage toward a second target value greater than the first target value in the second duration.

In an embodiment, when the driving frequency of the display panel is changed from the high driving frequency to the low driving frequency, the bias voltage of a second low frequency frame having the low driving frequency may be less than the bias voltage of the first low frequency frame and equal to or greater than the bias voltage of the high frequency frame.

In an embodiment, the second low frequency frame may include a third duration a third light emission time of a third duration and a fourth light emission time of a fourth duration greater than the third duration. The bias voltage in the fourth duration may be greater than the bias voltage in the third duration.

In an embodiment, the bias voltage may gradually increase toward a third target value in the third duration.

In an embodiment, the bias voltage may gradually increase toward a fourth target value greater than the third target value in the fourth duration.

In an embodiment, when the driving frequency of the display panel is changed from the high driving frequency to the low driving frequency and a difference between the high driving frequency and the low driving frequency is greater than a first threshold, a difference between the bias voltage in the first low frequency frame and the bias voltage in the high frequency frame is greater than a second threshold.

In an embodiment, the first low frequency frame may include a first light emission time of a first duration, a second light emission time of a second duration greater than the first duration and a third light emission time of a third duration greater than the second duration. The bias voltage in the third duration may be greater than the bias voltage in the second duration and the bias voltage in the second duration may be greater than the bias voltage in the first duration.

In an embodiment, the driving switching element may include a control electrode connected to a first node, a first electrode connected to a second node and a second electrode connected to a third node. The bias switching element may include a control electrode configured to receive a bias gate signal, a first electrode configured to receive the bias voltage and a second electrode connected to the second node.

In an embodiment, the pixel may further include a first emission switching element including a control electrode configured to receive a first emission signal, an input electrode configured to receive a high power voltage and an output electrode connected to the second node and a second emission switching element including a control electrode configured to receive a second emission signal, an input electrode connected to the third node and an output electrode connected to a first electrode of the light emitting element.

In an embodiment, the light emission time of the pixel may be determined by a turn-on time of the first emission signal and a turn-on time of the second emission signal.

In an embodiment, the pixel may further include a data writing switching element including a control electrode configured to receive a data writing gate signal, a first electrode configured to receive the data voltage and a second electrode connected to a fourth node, a first compensation writing switching element including a control electrode configured to receive a compensation gate signal, a first electrode connected to the first node and a second electrode connected to the third node, a data initialization switching element including a control electrode configured to receive a data initialization gate signal, a first electrode configured to receive an initialization voltage and a second electrode connected to the first node, a second compensation switching element including a control electrode configured to receive the compensation gate signal, a first electrode configured to receive a reference voltage and a second electrode connected to the fourth node and a light emitting element initialization switching element including a control electrode configured to receive the bias gate signal, a first electrode configured to receive a light emitting element initialization voltage and a second electrode connected to the first electrode of the light emitting element.

In an embodiment, the first compensation writing switching element may include two transistors connected to each other in series. The data initialization switching element may include two transistors connected to each other in series.

In an embodiment, the pixel may include the driving switching element including a control electrode connected to a first node, a first electrode connected to a second node and a second electrode connected to a third node, the bias switching element including a control electrode configured to receive a bias gate signal, a first electrode configured to receive the bias voltage and a second electrode connected to the second node, a first emission switching element including a control electrode configured to receive the emission signal, a first electrode configured to receive a high power voltage and a second electrode connected to the second node, a second emission switching element including a control electrode configured to receive the emission signal, a first electrode connected to the third node and a second electrode connected to a first electrode of the light emitting element, a data writing switching element including a control electrode configured to receive a data writing gate signal, a first electrode configured to receive the data voltage and a second electrode connected to the second node, a compensation switching element including a control electrode configured to receive a compensation gate signal, a first electrode connected to the first node and a second electrode connected to the third node, a data initialization switching element including a control electrode configured to receive a data initialization gate signal, a first electrode configured to receive an initialization voltage and a second electrode connected to the first node and a light emitting element initialization switching element including a control electrode configured to receive the bias gate signal, a first electrode configured to receive a light emitting element initialization voltage and a second electrode connected to the first electrode of the light emitting element.

In an embodiment, the compensation switching element may include two transistors connected to each other in series. The data initialization switching element may include two transistors connected to each other in series.

A method of driving a display apparatus according to the present inventive concept includes outputting a gate signal to a pixel of a display panel, outputting a data voltage to the pixel; outputting an emission signal to the pixel, and increasing a level of a bias voltage when a duration of a light emission time of the pixel is increased. The pixel includes a light emitting element, a driving switching element configured to apply a driving current to the light emitting element and a bias switching element configured to apply the bias voltage to the driving switching element.

In an embodiment, when a driving frequency of the display panel is changed from a high driving frequency to a low driving frequency, the bias voltage of a first low frequency frame having the low driving frequency may be equal to or greater than the bias voltage of a high frequency frame having the high driving frequency.

In an embodiment of an electronic apparatus according to the present inventive concept, the electronic apparatus includes a display panel, a gate driver, a data driver, an emission driver, a driving controller and a processor. The display panel includes a pixel. The gate driver is configured to output a gate signal to the pixel. The data driver is configured to output a data voltage to the pixel. The emission driver is configured to output an emission signal to the pixel. The driving controller is configured to control the gate driver, the data driver and the emission driver. The processor is configured to output input image data and an input control signal to the driving controller. The pixel includes a light emitting element, a driving switching element configured to apply a driving current to the light emitting element and a bias switching element configured to apply a bias voltage to the driving switching element. The electronic apparatus increases a level of the bias voltage when a duration of a light emission time of the pixel is increased.

According to the display apparatus, the method of driving the display apparatus and the electronic apparatus including the display apparatus, the driving controller may increase the level of the bias voltage when a duration of the light emission time of the pixel is increased. Accordingly, when the driving frequency of the display panel is changed from the high driving frequency to the low driving frequency, the luminance difference of the display panel may be reduced. Thus, flicker perceivable to a user due to the luminance difference may be removed or reduced.

In addition, when a holding period is maintained in the low frequency driving, the luminance of the display panel may decrease especially in the high grayscale range. To compensate for the luminance decrease of the display panel, light emission time control driving may be performed to increase a duration of the light emission time in a later portion of the low frequency frame. The level of the bias voltage may be increased when the duration of the light emission time of the pixel is increased. Accordingly, when the driving frequency of the display panel is changed from the high driving frequency to the low driving frequency, the luminance difference of the display panel may be reduced in the low grayscale range.

Therefore, the display quality of the display panel may be increased.

BRIEF DESCRIPTION OF THE DRAWINGS

The above and other features of the inventive concept will become more apparent by describing in detailed embodiments thereof with reference to the accompanying drawings, in which.

DETAILED DESCRIPTION

Hereinafter, embodiments of the present inventive concept will be explained in detail with reference to the accompanying drawings.

Figure 1:
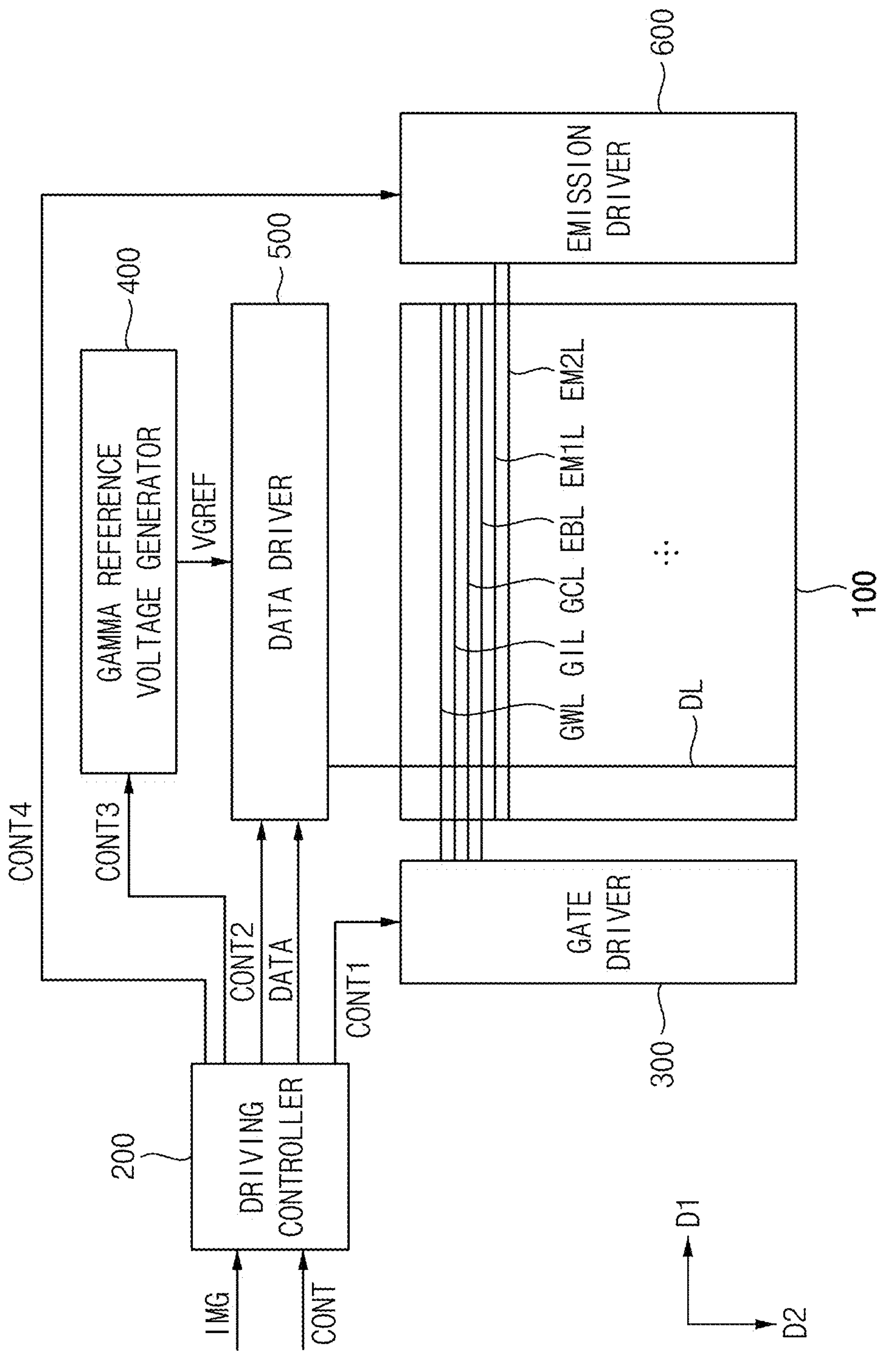
FIG. 1 is a block diagram illustrating a display apparatus according to an embodiment of the present inventive concept.

FIG. 1 is a block diagram illustrating a display apparatus according to an embodiment of the present inventive concept.

Referring to FIG. 1, the display apparatus includes a display panel 100 and a display panel driver. The display panel driver includes a driving controller 200 (e.g., a controller circuit), a gate driver 300 (e.g., a driver circuit), a gamma reference voltage generator 400, a data driver 500 (e.g., a driver circuit) and an emission driver 600 (e.g., a driver circuit).

The display panel 100 has a display region on which an image is displayed and a peripheral region adjacent to the display region. For example, no image may be displayed in the peripheral region.

The display panel 100 includes a plurality of gate lines GWL, GIL, GCL and EBL, a plurality of data lines DL, a plurality of emission lines EM1L and EM2L and a plurality of pixels electrically connected to the gate lines GWL, GIL, GCL and EBL, the data lines DL and the emission lines EM1L and EM2L. The gate lines GWL, GIL, GCL and EBL may extend in a first direction D1, the data lines DL may extend in a second direction D2 crossing the first direction D1 and the emission lines EM1L and EM2L may extend in the first direction D1.

The driving controller 200 receives input image data IMG and an input control signal CONT from an external apparatus. For example, the input image data IMG may include red image data, green image data and blue image data. The input image data IMG may include white image data. The input image data IMG may include magenta image data, cyan image data and yellow image data. The input control signal CONT may include a master clock signal and a data enable signal. The input control signal CONT may further include a vertical synchronizing signal and a horizontal synchronizing signal.

The driving controller 200 generates a first control signal CONT1, a second control signal CONT2, a third control signal CONT3, a fourth control signal CONT4 and a data signal DATA based on the input image data IMG and the input control signal CONT.

The driving controller 200 generates the first control signal CONT1 for controlling an operation of the gate driver 300 based on the input control signal CONT, and outputs the first control signal CONT1 to the gate driver 300. The first control signal CONT1 may include a vertical start signal and a gate clock signal.

The driving controller 200 generates the second control signal CONT2 for controlling an operation of the data driver 500 based on the input control signal CONT, and outputs the second control signal CONT2 to the data driver 500. The second control signal CONT2 may include a horizontal start signal and a load signal.

The driving controller 200 generates the data signal DATA based on the input image data IMG. The driving controller 200 outputs the data signal DATA to the data driver 500.

The driving controller 200 generates the third control signal CONT3 for controlling an operation of the gamma reference voltage generator 400 based on the input control signal CONT, and outputs the third control signal CONT3 to the gamma reference voltage generator 400.

The driving controller 200 generates the fourth control signal CONT4 for controlling an operation of the emission driver 600 based on the input control signal CONT, and outputs the fourth control signal CONT4 to the emission driver 600.

The gate driver 300 generates gate signals driving the gate lines GWL, GIL, GCL and EBL in response to the first control signal CONT1 received from the driving controller 200. The gate driver 300 may output the gate signals to the gate lines GWL, GIL, GCL and EBL. The gate signals may include a data initialization gate signal, a compensation gate signal, a data writing gate signal and a bias gate signal.

In an embodiment of the present inventive concept, the gate driver 300 may be integrated on the peripheral region of the display panel 100. In an embodiment of the present inventive concept, the gate driver 300 may be mounted on the peripheral region of the display panel 100.

The gamma reference voltage generator 400 generates a gamma reference voltage VGREF in response to the third control signal CONT3 received from the driving controller 200. The gamma reference voltage generator 400 provides the gamma reference voltage VGREF to the data driver 500. In an embodiment, the gamma reference voltage VGREF has a value corresponding to a level of the data signal DATA.

In an embodiment, the gamma reference voltage generator 400 may be disposed in the driving controller 200, or in the data driver 500.

The data driver 500 receives the second control signal CONT2 and the data signal DATA from the driving controller 200, and receives the gamma reference voltages VGREF from the gamma reference voltage generator 400. The data driver 500 converts the data signal DATA into data voltages having an analog type using the gamma reference voltages VGREF. The data driver 500 outputs the data voltages to the data lines DL.

In an embodiment of the present inventive concept, the data driver 500 may be integrated on the peripheral region of the display panel 100. In an embodiment of the present inventive concept, the data driver 500 may be mounted on the peripheral region of the display panel 100.

The emission driver 600 generates emission signals to drive the emission lines EM1L and EM2L in response to the fourth control signal CONT4 received from the driving controller 200. The emission driver 600 may output the emission signals to the emission lines EM1L and EM2L. The emission signals may include a first emission signal and a second emission signal.

In an embodiment of the present inventive concept, the emission driver 600 may be integrated on the peripheral region of the display panel 100. In an embodiment of the present inventive concept, the emission driver 600 may be mounted on the peripheral region of the display panel 100.

Although the gate driver 300 is disposed at a first side of the display panel 100 and the emission driver 600 is disposed at a second side of the display panel 100 opposite to the first side in FIG. 1 for convenience of explanation, the present inventive concept is not limited thereto. For example, both of the gate driver 300 and the emission driver 600 may be disposed at the first side of the display panel 100. For example, the gate driver 300 and the emission driver 600 may be integrally formed. For example, a single driver may perform the functions of the gate driver 300 and the emission driver 600.

Figure 2:
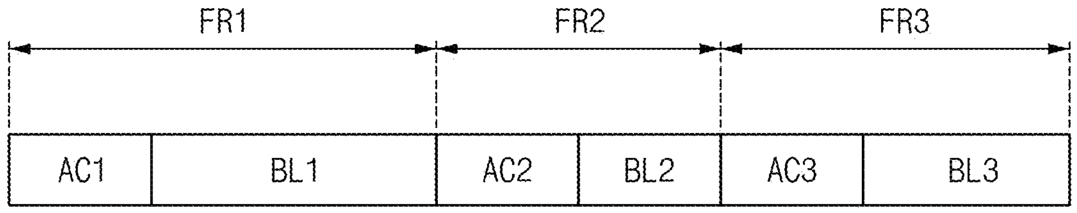
FIG. 2 is a conceptual diagram illustrating a driving frequency of a display panel of FIG. 1.

FIG. 2 is a conceptual diagram illustrating a driving frequency of the display panel 100 of FIG. 1.

Referring to FIGS. 1 and 2, the display panel 100 may be driven at a variable frequency. A first frame FR1 (e.g., a first frame period) having a first frequency may include a first active period AC1 and a first blank period BL1. A second frame FR2 (e.g., a second frame period) having a second frequency different from the first frequency may include a second active period AC2 and a second blank period BL2. A third frame FR3 (e.g., a third frame period) having a third frequency different from the first frequency and the second frequency may include a third active period AC3 and a third blank period BL3.

The first active period AC1 may have a length the same as or substantially the same as a length of the second active period AC2. The first blank period BL1 may have a length different from a length of the second blank period BL2. For example, in FIG. 2, a duration of the first blank period BL1 is longer than a duration of the second blank period BL2.

The second active period AC2 may have a length the same as or substantially the same as a length of the third active period AC3. The second blank period BL2 may have a length different from a length of the third blank period BL3. For example, in FIG. 2, a duration of the third blank period BL3 is longer than a duration of the second blank period BL2.

A driving sequence of the display apparatus supporting the variable frequency driving may include a writing period in which the data voltage is written to the pixel and a holding period in which only light emission occurs without writing the data voltage to the pixel. The writing period may be disposed in the active period AC1, AC2 and AC3. The holding period may be disposed in the blank period BL1, BL2 and BL3.

Figure 3:
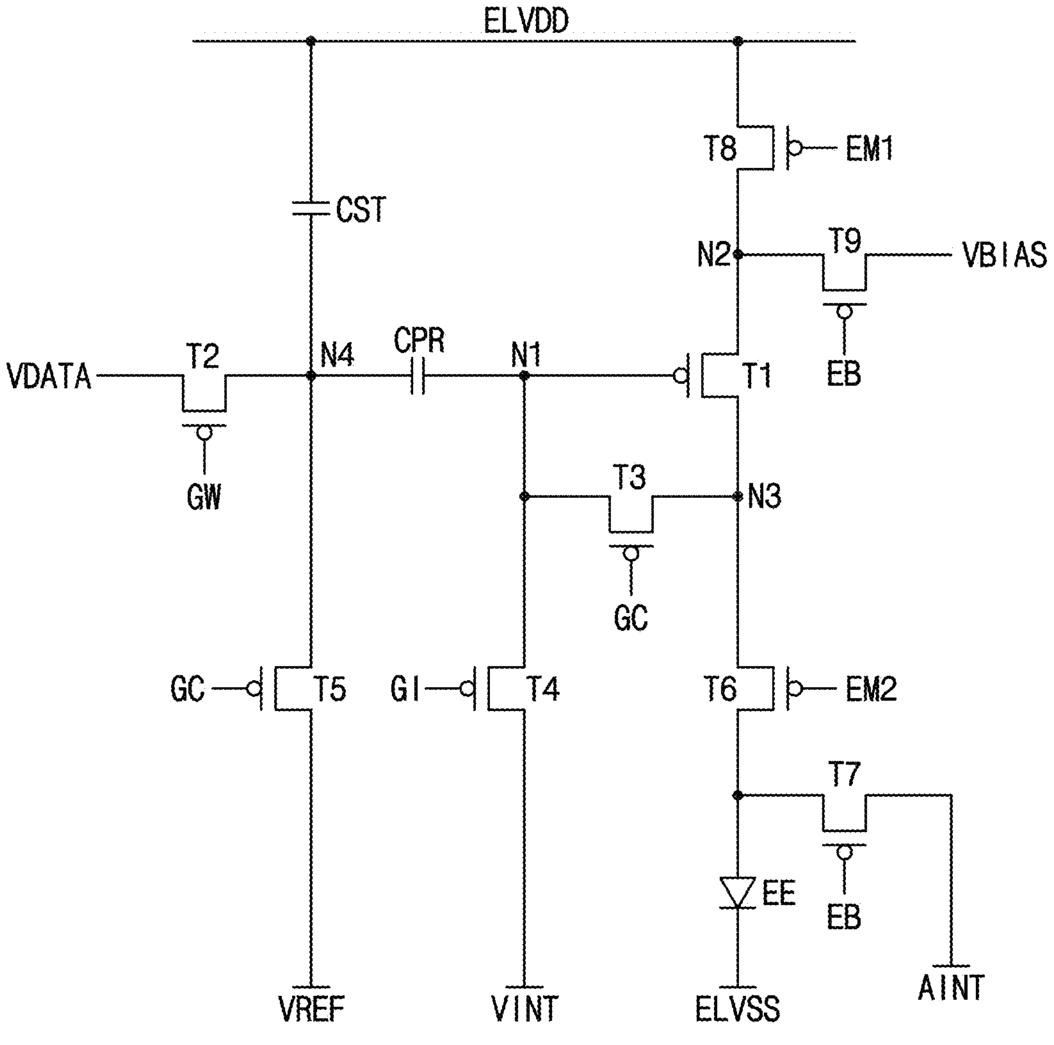
FIG. 3 is a circuit diagram illustrating a pixel of the display panel of FIG. 1.

FIG. 3 is a circuit diagram illustrating the pixel of the display panel 100 of FIG. 1 according to an embodiment but is not limited thereto.

Referring to FIGS. 1 to 3, the pixel may include a light emitting element EE, a driving switching element T1 (e.g., a first transistor) applying a driving current to the light emitting element EE and a bias switching element T9 (e.g., a ninth transistor) applying a bias voltage VBIAS to the driving switching element T1. In an embodiment, when a duration of a light emission time of the pixel increases, a level of the bias voltage VBIAS is increased.

The driving switching element T1 may include a control (or gate) electrode connected to a first node N1, a first electrode connected to a second node N2 and a second electrode connected to a third node N3.

The bias switching element T9 may include a control electrode receiving a bias gate signal EB, a first electrode receiving the bias voltage VBIAS and a second electrode connected to the second node N2.

The pixel may further include a first emission switching element T8 (e.g., an eighth transistor) including a control electrode receiving the first emission signal EM1, a first electrode receiving a high power voltage ELVDD and a second electrode connected to the second node N2 and a second emission switching element T6 (e.g., a sixth transistor) including a control electrode receiving the second emission signal EM2, a first electrode connected to the third node N3 and a second electrode connected to a first electrode of the light emitting element EE.

For example, the light emission time of the pixel may be determined by a turn-on time of the first emission signal EM1 and a turn-on time of the second emission signal EM2.

The pixel may further include a data writing switching element T2 (e.g., a second transistor) including a control electrode receiving a data writing gate signal GW, a first electrode receiving the data voltage VDATA and a second electrode connected to a fourth node N4, a first compensation switching element T3 (e.g., a third transistor) including a control electrode receiving a compensation gate signal GC, a first electrode connected to the first node N1 and a second electrode connected to the third node N3, a data initialization switching element T4 (e.g., a fourth transistor) including a control electrode receiving a data initialization gate signal GI, a first electrode receiving an initialization voltage VINT and a second electrode connected to the first node N1, a second compensation switching element T5 (e.g., a fifth transistor) including a control electrode receiving the compensation gate signal GC, a first electrode receiving a reference voltage VREF and a second electrode connected to the fourth node N4 and a light emitting element initialization switching element T7 (e.g., a seventh transistor) including a control electrode receiving the bias gate signal EB, a first electrode receiving a light emitting element initialization voltage AINT and a second electrode connected to the first electrode of the light emitting element EE.

The pixel may further include a first capacitor CST including a first electrode receiving the high power voltage ELVDD and a second electrode connected to the fourth node N4 and a second capacitor CPR including a first electrode connected to the fourth node N4 and a second electrode connected to the first node N1. The first capacitor CST and the second capacitor CPR may maintain a level of the data voltage VDATA applied to the control electrode N1 of the driving switching element T1.

A low power voltage ELVSS may be applied to a second electrode of the light emitting element EE. A level of the low power voltage ELVSS may be lower than a level of the high power voltage ELVDD. For example, the lower power voltage may be a ground voltage.

For example, the driving switching element T1 may be a P-type transistor. For example, the driving switching element T1 may be a low temperature polysilicon (LTPS) thin film transistor.

For example, the data writing switching element T2 may be a P-type transistor. For example, the data writing switching element T2 may be a low temperature polysilicon (LTPS) thin film transistor.

For example, the first compensation switching element T3 may be a P-type transistor. For example, the first compensation switching element T3 may be a low temperature polysilicon (LTPS) thin film transistor.

For example, the data initialization switching element T4 may be a P-type transistor. For example, the data initialization switching element T4 may be a low temperature polysilicon (LTPS) thin film transistor.

For example, the second compensation switching element T5 may be a P-type transistor. For example, the second compensation switching element T5 may be a low temperature polysilicon (LTPS) thin film transistor.

For example, the second emission switching element T6 may be a P-type transistor. For example, the second emission switching element T6 may be a low temperature polysilicon (LTPS) thin film transistor.

For example, the light emitting element initialization switching element T7 may be a P-type transistor. For example, the light emitting element initialization switching element T7 may be a low temperature polysilicon (LTPS) thin film transistor.

For example, the first emission switching element T8 may be a P-type transistor. For example, the first emission switching element T8 may be a low temperature polysilicon (LTPS) thin film transistor.

For example, the bias switching element T9 may be a P-type transistor. For example, the bias switching element T9 may be a low temperature polysilicon (LTPS) thin film transistor.

Figure 4:
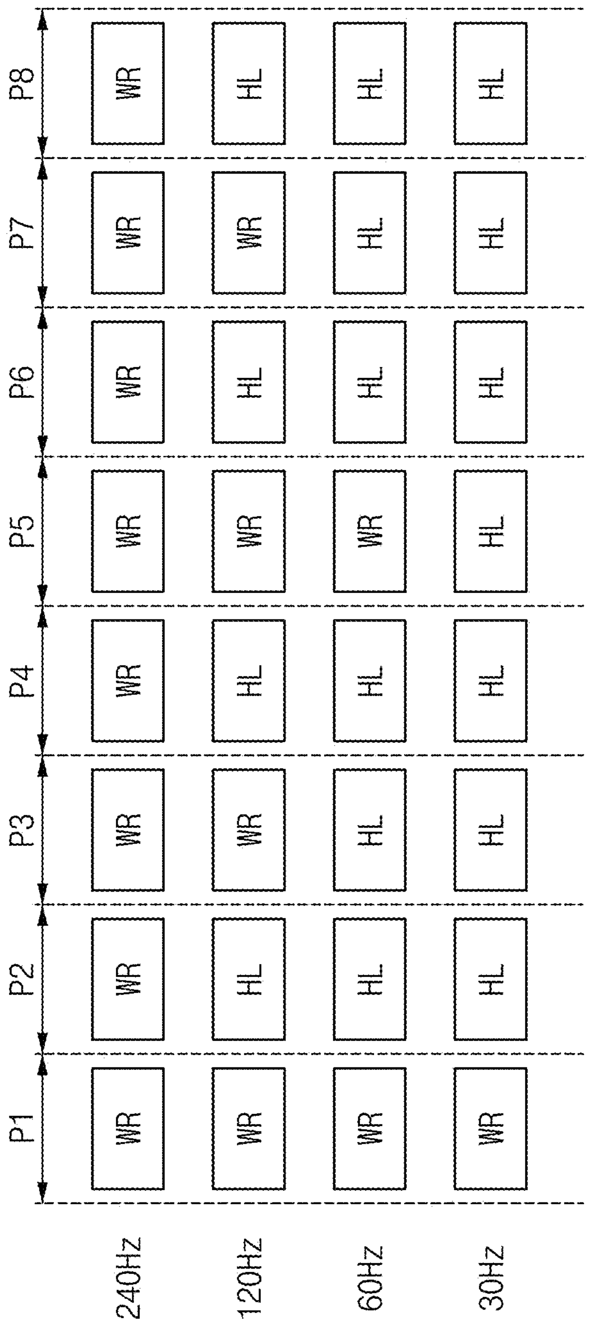
FIG. 4 is a diagram illustrating an example of a driving sequence according to the driving frequency of the display panel of FIG. 1.

FIG. 4 is a diagram illustrating an example of a driving sequence according to the driving frequency of the display panel of FIG. 1.

Referring to FIGS. 1 to 4, the display panel 100 may be driven in a low driving frequency. The display panel 100 may be driven in a variable frequency. For example, when the display panel 100 displays a moving image, the display panel 100 may be driven in a relatively high driving frequency. In contrast, when the display panel 100 displays a static or non-moving image, the display panel 100 may be driven in a relatively low driving frequency. For example, when a possibility of occurrence of flicker in an image displayed on the display panel 100 is high, the display panel 100 may be driven in a relatively high driving frequency. In contrast, when a possibility of occurrence of flicker in the image displayed on the display panel 100 is low, the display panel 100 may be driven in a relatively low driving frequency.

For example, a maximum driving frequency of the display panel 100 may be 240 Hz as shown in FIG. 4. However, the present inventive concept is not limited thereto.

The driving sequence of the display panel 100 may include an writing period WR when the data voltage VDATA is applied to the first electrode of the driving switching element T1 and the light emitting element EE emits a light and a holding period HL when the data voltage VDATA is not applied to the first electrode of the driving switching element T1 but the light emitting element EE emits a light. In the writing period WR, the data writing switching element T2 is turned on so that the data voltage VDATA may be applied to the first electrode of the driving switching element T1. In the holding period HL, the data writing switching element T2 is turned off so that the data voltage VDATA is not applied to the first electrode of the driving switching element T1.

For example, an embodiment may provide one-cycle driving in which one frame (or one frame period) includes one cycle in the maximum driving frequency (e.g., 240 Hz).

For example, when the display panel 100 is driven at 240 Hz, first to eighth periods P1 to P8 may be the writing periods WR. Herein, each of the first to eighth periods P1 to P8 may be one cycle. In addition, each of the first to eighth periods P1 to P8 may be one frame or one frame period.

For example, when the display panel 100 is driven at 120 Hz, a ratio between the writing period WR and the holding period HL may be 1:1. For example, the writing period WR and the holding period HL may alternate with one another and have a same duration. For example, when the display panel 100 is driven at 120 Hz, the first period P1, the third period P3, the fifth period P5 and the seventh period P7 may be the writing periods WR and the second period P2, the fourth period P4, the sixth period P6 and the eighth period P8 may be the holding periods HL. Herein, each of the first to eighth periods P1 to P8 may be one cycle. In addition, the first period P1 and the second period P2 may form a first frame (or a first frame period), the third period P3 and the fourth period P4 may form a second frame (or a second frame period), the fifth period P5 and the sixth period P6 may form a third frame (or a third frame period) and the seventh period P7 and the eighth period P8 may form a fourth frame (e.g., or a fourth frame period).

For example, when the display panel 100 is driven at 60 Hz, a ratio between the writing period WR and the holding period HL may be 1:3. For example, when the display panel 100 is driven at 60 Hz, the first period P1 and the fifth period P5 may be the writing periods WR and the second period P2, the third period P3, the fourth period P4, the sixth period P6, the seventh period P7 and the eighth period P8 may be the holding periods HL. Herein, each of the first to eighth periods P1 to P8 may be one cycle. In addition, the first period P1 to the fourth period P4 may form a first frame (or a first frame period), the fifth period P5 to the eighth period P8 may form a second frame (or a second frame period).

For example, when the display panel 100 is driven at 30 Hz, a ratio between the writing period WR and the holding period HL may be 1:7. For example, when the display panel 100 is driven at 30 Hz, the first period P1 may be the writing period WR and the second period P2, the third period P3, the fourth period P4, the fifth period P5, the sixth period P6, the seventh period P7 and the eighth period P8 may be the holding periods HL. Herein, each of the first to eighth periods P1 to P8 may be one cycle. In addition, the first period P1 to the eighth period P8 may form a first frame (or a first frame period).

Figure 5:
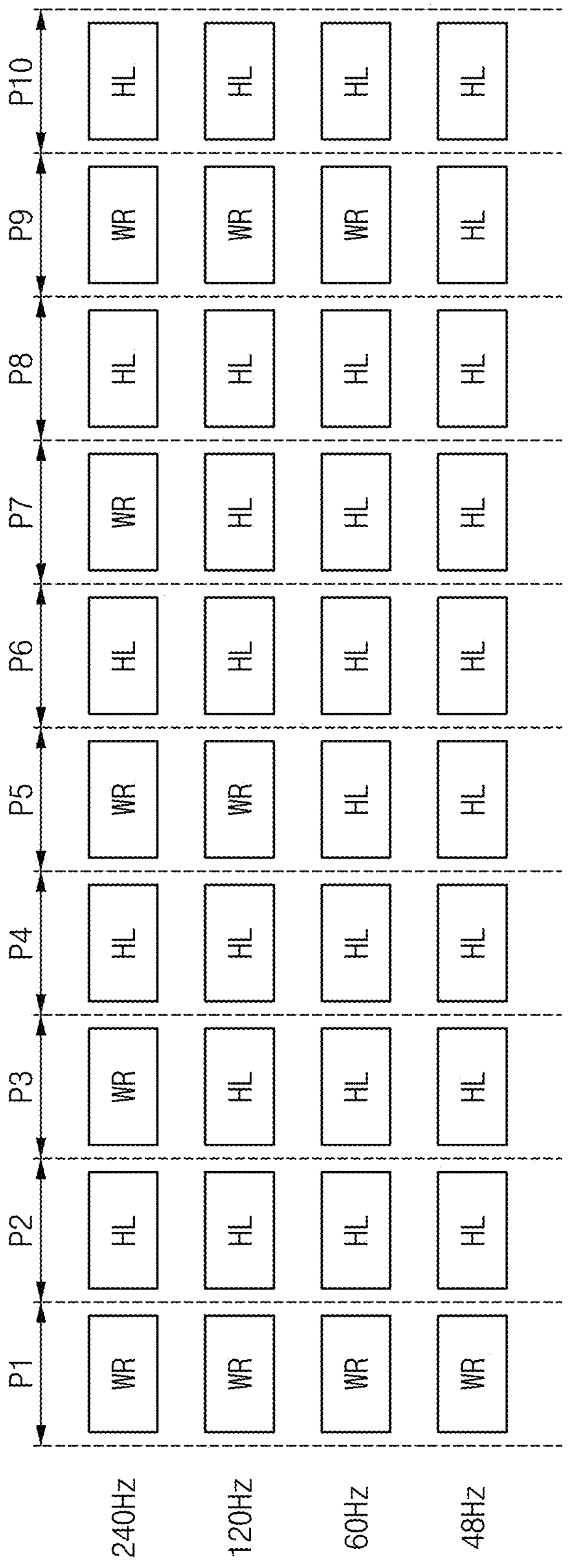
FIG. 5 is a diagram illustrating an example of the driving sequence according to the driving frequency of the display panel of FIG. 1.

FIG. 5 is a diagram illustrating an example of the driving sequence according to the driving frequency of the display panel of FIG. 1.

For example, FIG. 5 may illustrate two-cycle driving in which one frame includes two cycles in the maximum driving frequency (e.g., 240 Hz).

For example, when the display panel 100 is driven at 240 Hz, a ratio between the writing period WR and the holding period HL may be 1:1. For example, when the display panel 100 is driven at 240 Hz, the first period P1, the third period P3, the fifth period P5 and the seventh period P7 may be the writing periods WR and the second period P2, the fourth period P4, the sixth period P6 and the eighth period P8 may be the holding periods HL. Herein, each of the first to eighth periods P1 to P8 may be one cycle. In addition, the first period P1 and the second period P2 may form a first frame (or a first frame period), the third period P3 and the fourth period P4 may form a second frame (or a second frame period), the fifth period P5 and the sixth period P6 may form a third frame (or a third frame period) and the seventh period P7 and the eighth period P8 may form a fourth frame (or a fourth frame period).

For example, when the display panel 100 is driven at 120 Hz, a ratio between the writing period WR and the holding period HL may be 1:3. For example, when the display panel 100 is driven at 120 Hz, the first period P1 and the fifth period P5 may be the writing periods WR and the second period P2, the third period P3, the fourth period P4, the sixth period P6, the seventh period P7 and the eighth period P8 may be the holding periods HL. Herein, each of the first to eighth periods P1 to P8 may be one cycle. In addition, the first period P1 to the fourth period P4 may form a first frame (e.g., a first frame period), the fifth period P5 to the eighth period P8 may form a second frame (e.g., a second frame period).

For example, when the display panel 100 is driven at 60 Hz, a ratio between the writing period WR and the holding period HL may be 1:7. For example, when the display panel 100 is driven at 60 Hz, the first period P1 may be the writing period WR and the second period P2, the third period P3, the fourth period P4, the fifth period P5, the sixth period P6, the seventh period P7 and the eighth period P8 may be the holding periods HL. Herein, each of the first to eighth periods P1 to P8 may be one cycle. In addition, the first period P1 to the eighth period P8 may form a first frame (or a first frame period).

For example, when the display panel 100 is driven at 48 Hz, a ratio between the writing period WR and the holding period HL may be 1:9. For example, when the display panel 100 is driven at 48 Hz, the first period P1 may be the writing period WR and the second period P2, the third period P3, the fourth period P4, the fifth period P5, the sixth period P6, the seventh period P7, the eighth period P8, a ninth period P9 and a tenth period P10 may be the holding periods HL. Herein, each of the first to tenth periods P1 to P10 may be one cycle. In addition, the first period P1 to the tenth period P10 may form a first frame (or a first frame period).

Figure 6:
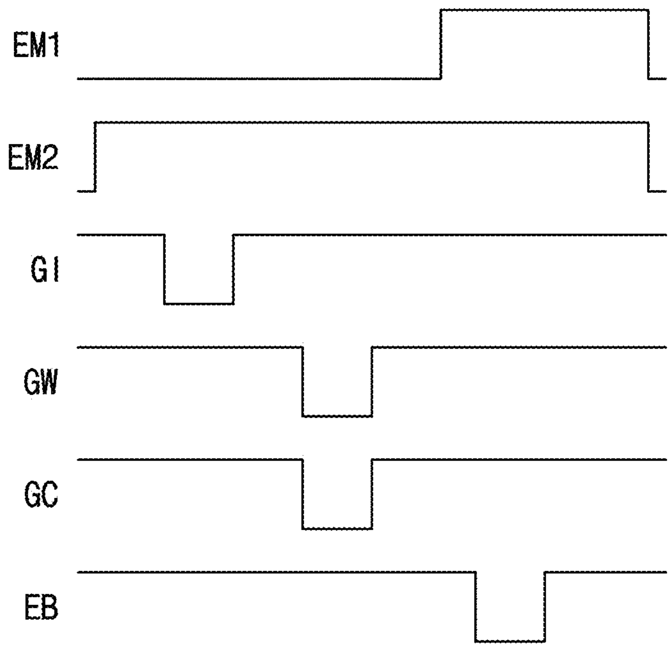
FIG. 6 is a timing diagram illustrating an example of input signals applied to the display panel of FIG. 1 in a writing period.
Figure 7:
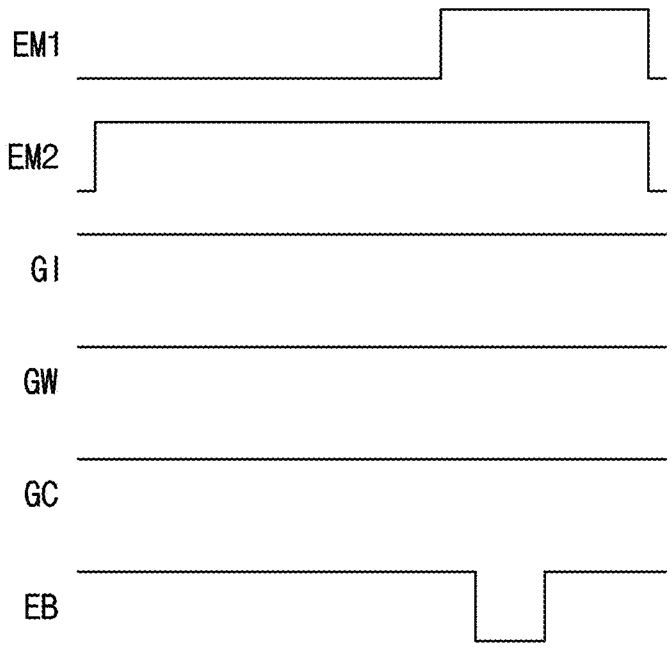
FIG. 7 is a timing diagram illustrating an example of the input signals applied to the display panel of FIG. 1 in a holding period.

FIG. 6 is a timing diagram illustrating an example of input signals applied to the display panel 100 of FIG. 1 in the writing period WR. FIG. 7 is a timing diagram illustrating an example of the input signals applied to the display panel 100 of FIG. 1 in the holding period HL.

Referring to FIGS. 1 to 7, the data initialization gate signal GI may have an active pulse, the data writing gate signal GW may have an active pulse, the compensation gate signal GC may have an active pulse and the bias gate signal EB may have an active pulse in the writing period WR of FIG. 6. Herein, the active pulses may be pulses of a low level but embodiments are not limited thereto. The bias gate signal EB may be provided by the gate driver 300. Alternatively, the bias gate signal EB may be provided by the emission driver 600 but embodiments are not limited thereto. The bias voltage VBIAS may be provided by a voltage generator separate from the gamma reference voltage generator 400 but embodiments are not limited thereto. For example, the bias voltage VBIAS may instead be provided by the driving controller 200, the gate driver 300, the gamma reference voltage generator 400, or the data driver 500.

When the gate initialization gate signal GI has the active pulse, the data initialization switching element T4 may be turned on so that the initialization voltage VINT may be applied to the control electrode N1 of the driving switching element T1.

When the data writing gate signal GW and the compensation gate signal GC have the active pulses, the data writing switching element T2 and the first compensation switching element T3 may be turned on so that the data voltage VDATA, which the threshold voltage of the driving switching element T1 is compensated for, may be applied to the control electrode N1 of the driving switching element T1.

When the bias gate signal EB has the active pulse, the light emitting element initialization switching element T7 may be turned on so that the light emitting element initialization voltage AINT may be applied to the first electrode of the light emitting element EE. In addition, when the bias gate signal EB has the active pulse, the bias switching element T9 may be turned on so that the bias voltage VBIAS may be applied to the first electrode N2 of the driving switching element T1.

In an embodiment, the data initialization gate signal GI does not have an active pulse but maintains an inactive level, the data writing gate signal GW does not have an active pulse but maintains an inactive level, the compensation gate signal GC does not have an active pulse but maintains an inactive level and the bias gate signal EB has an active pulse in the holding period HL of FIG. 7. Herein, the inactive level is a high level and the active pulse is a pulse of a low level but embodiments are not limited thereto.

In the holding period HL, a data initialization operation by the data initialization switching element T4 and a data writing operation by the data writing switching element T2 and the first compensation switching element T3 are not operated or are not performed. In contrast, in the holding period HL, a light emitting element initialization operation by the light emitting element initialization switching element T7 and a bias operation by the bias switching element T9 are operated or performed.

In the writing period WR of FIG. 6, when the data initialization gate signal GI, the data writing gate signal GW, the compensation gate signal GC and the bias gate signal EB has the active pulses, the second emission signal EM2 may have an inactive level (e.g., a logic high level). In the writing period WR of FIG. 6, when the bias gate signal EB has the active pulse, the first emission signal EM1 may have an inactive level (e.g., a logic high level). An inactive period of the first emission signal EM1 may be included in an inactive period of the second emission signal EM2. For example, the inactive period of the first emission EM1 may occur within the inactive period of the second emission signal EM2.

A waveform of the first emission signal EM1 in the holding period HL of FIG. 7 may be the same as or substantially the same as a waveform of the first emission signal EM1 in the writing period WR of FIG. 6. In addition, a waveform of the second emission signal EM2 in the holding period HL of FIG. 7 may be the same as or substantially the same as a waveform of the second emission signal EM2 in the writing period WR of FIG. 6.

Figure 8A:
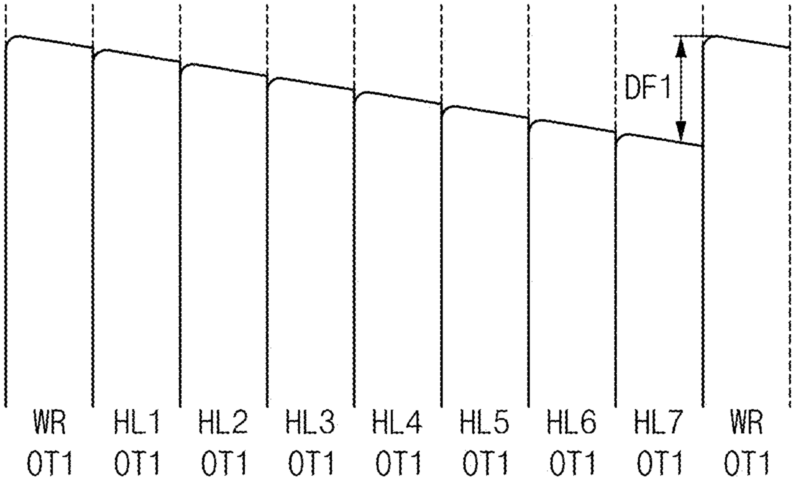
FIG. 8A is a timing diagram illustrating a luminance of the display panel of FIG. 1 when a light emission time control driving is not performed.

FIG. 8A is a timing diagram illustrating a luminance of the display panel 100 of FIG. 1 when a light emission time control driving is not performed.

In FIG. 8A, WR represents the writing period, HL1 to HL7 represent the holding periods. In the low frequency driving, the driving sequence may include one writing period and the plural holding periods corresponding to one writing period as shown in FIG. 8A.

When the holding period maintains in the low frequency driving, the luminance of the display panel 100 may decrease. When the holding period maintains in the low frequency driving, the luminance of the display panel 100 may decrease especially in a high grayscale range. For example, a decreased luminance may be more apparent in images that are in the high grayscale range.

When a seventh holding period HL7 is a last holding period in FIG. 8A, a difference between a luminance of the seventh holding period HL7 and a luminance of a writing period WR of a next frame may be represented as 1. This luminance difference 1 may be perceivable to a user as a flicker.

Figure 8B:
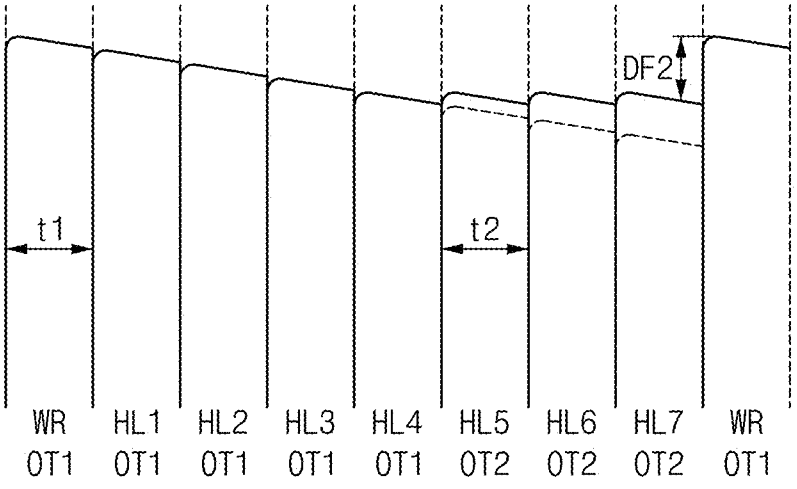
FIG. 8B is a timing diagram illustrating a luminance of the display panel of FIG. 1 when the light emission time control driving is performed.

FIG. 8B is a timing diagram illustrating a luminance of the display panel 100 of FIG. 1 when light emission time control driving is performed according to an embodiment of the disclosure.

As explained above referring to FIG. 8A, when the holding period maintains in the low frequency driving, the luminance of the display panel 100 may decrease and the luminance decrease may be perceivable to the user as the flicker.

As shown in FIG. 8B, to compensate the luminance decrease of the display panel 100, the light emission time control driving may be performed to increase a light emission time in a later portion (e.g. HL5 to HL7) of the low frequency frame. For example, the light emission time in each cycle may be a first light emission time OT1 in an earlier portion (including WR and HL1 to HL4) of the low frequency frame. In an embodiment, the light emission time in each cycle is a second light emission time OT2 longer than the first light emission time OT1 in the later portion (including HL5 to HL7) of the low frequency frame.

In this way, when the light emission time is increased in the later portion (e.g. HL5 to HL7) of the low frequency frame, the luminance of each cycle in the later portion (e.g. HL5 to HL7) of the low-frequency frame may be increased. For example, a duration of the light emission time may be fixed or constant for each of a first number of holding periods of the low frequency frame, and then the light emission time may be increased during a next holding period after the first number of holding periods, and then the duration of the light emission time may be maintained at the increased value for the remaining holding periods of the low frequency frame.

When a seventh holding period HL7 is a last holding period in FIG. 8B, a difference between a luminance of the seventh holding period HL7 and a luminance of a writing period WR of a next frame may be represented as DF2. The light emission time is increased in the later portion (e.g. HL5 to HL7) of the low frequency frame so that the luminance difference DF2 between the last holding period and the next writing period in FIG. 8B may be decreased compared to the luminance difference DF1 in FIG. 8A and the flicker may be reduced.

In FIG. 8B, the cycle (e.g. WR, HL1, HL2, HL3, HL4) having the first light emission time OT1 may have a first time duration t1 and the cycle (e.g. HL5, HL6, HL7) having the second light emission time OT2 may have a second time duration t2. For example, the writing period WR may have the first time duration t1 and the fifth holding period HL5 may have the second time duration t2. For example, the second time duration t2 may be equal to or greater than the first time duration t1. For example, the second time duration t2 of at least one of the later holding periods may greater than the first time duration t1.

In addition, the cycles (e.g. HL5, HL6, HL7) having the second light emission time OT2 may have the same duration (e.g., the second time duration t2). Alternatively, the cycles (e.g. HL5, HL6, HL7) having the second light emission time OT2 may have different durations. For example, a duration of the fifth holding period HL5 may be different from a duration of the sixth holding period HL6. For example, the duration of the sixth holding period HL6 may be different from a duration of the seventh holding period HL7.

Figure 9A:
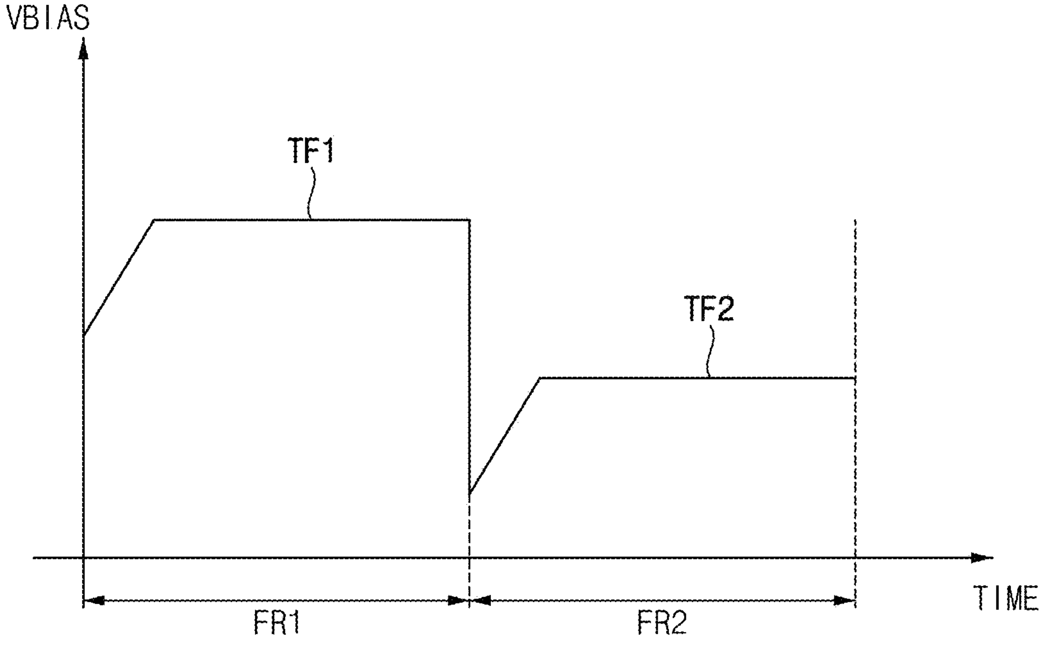
FIG. 9A is a timing diagram illustrating an example of a bias voltage applied to a pixel of FIG. 3 when the light emission time control driving is not performed.

FIG. 9A is a timing diagram illustrating an example of the bias voltage VBIAS applied to the pixel of FIG. 3 when the light emission time control driving is not performed.

A hysteresis characteristic of the driving switching element T1 of the pixel in the writing period WR and a hysteresis characteristic of the driving switching element T1 of the pixel in the holding period HL are different from each other so that a luminance difference of the display panel 100 may be generated when the driving frequency of the display panel 100 is changed from the high driving frequency to the low driving frequency. Due to this luminance difference, a flicker may be perceivable by a user. This luminance difference may be great especially in a low grayscale range. For example, the luminance difference may be more easily perceived when an image is displayed in the low grayscale range.

In FIG. 9A, when the driving frequency of the display panel 100 is changed from the high driving frequency to the low driving frequency, the bias voltage VBIAS of a first low frequency frame FR1 having the low driving frequency may be set to be equal to or greater than the bias voltage VBIAS of a high frequency frame (a period prior to FR1) having the high driving frequency. For example, a target value of the bias voltage VBIAS in the first low frequency frame FR1 is TF1. In the first low frequency frame FR1, the bias voltage VBIAS may gradually increase toward the target value TF1. In an embodiment, the target value TF1 of the bias voltage VBIAS is higher than the bias voltage VBIAS of the prior high frequency frame. In an embodiment, the bias voltage VBIAS at a beginning of the first low frequency frame FR1 is to set to be equal to or greater than the bias voltage VBIAS of the prior high frequency frame, and then is gradually increased to the target value TF1 that is greater than the bias voltage VBIAS of the prior high frequency frame.

The luminance in the first low frequency frame FR1 may be generally greater than the luminance in the high frequency frame. Thus, when the bias voltage VBIAS of the first low frequency frame FR1 is set to be greater than the bias voltage VBIAS of the high frequency frame, the luminance of the low grayscale range may be decreased in the first low frequency frame FR1. Therefore, the luminance difference may be reduced by setting the bias voltage VBIAS of the first low frequency frame FR1 to be greater than the bias voltage VBIAS of the high frequency frame. According to an embodiment, the bias voltage VBIAS of the first low frequency frame FR1 is set to be equal to the bias voltage VBIAS of the high frequency frame.

In addition, the bias voltage VBIAS of a second low frequency frame FR2 having the low driving frequency may be set to be less than the bias voltage VBIAS of the first low frequency frame FR1.

The luminance decrease, when the driving frequency of the display panel 100 is changed from the high driving frequency to the low driving frequency, is more severe in the first low frequency frame FR1 so that an increase of the bias voltage VBIAS in the second low frequency frame FR2 may be set to be less than the increase of the bias voltage VBIAS in the first low frequency frame FR1.

In an embodiment, the bias voltage VBIAS in the second low frequency frame FR2 is greater than the bias voltage VBIAS in the high frequency frame. For example, a target value of the bias voltage VBIAS in the second low frequency frame FR2 is TF2. In the second low frequency frame FR2, the bias voltage VBIAS may gradually increase toward the target value TF2.

Figure 9B:
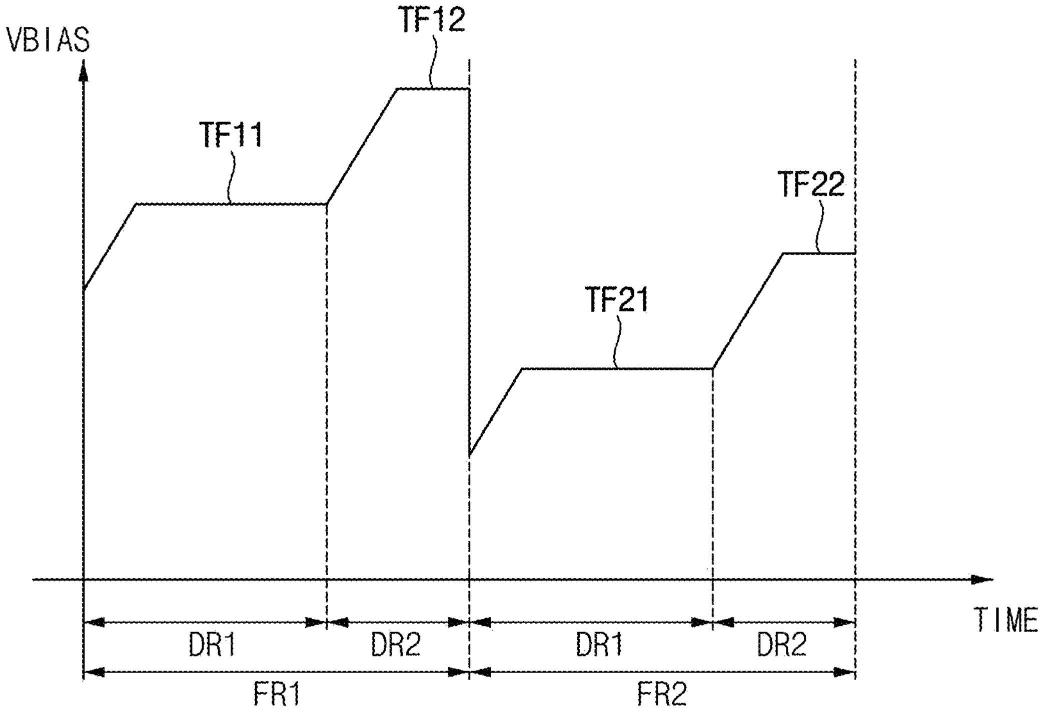
FIG. 9B is a timing diagram illustrating an example of the bias voltage applied to the pixel of FIG. 3 when the light emission time control driving is performed.

FIG. 9B is a timing diagram illustrating an example of the bias voltage VBIAS applied to the pixel of FIG. 3 when the light emission time control driving is performed.

In FIG. 9B, when the driving frequency of the display panel 100 is changed from the high driving frequency to the low driving frequency, the bias voltage VBIAS of a first low frequency frame FR1 having the low driving frequency may be set to be equal to or greater than the bias voltage VBIAS of a high frequency frame (a period prior to FR1) having the high driving frequency.

In addition, the first low frequency frame FR1 may include a first duration DR1 having the first light emission time (e.g., OT1 in FIG. 8B) and a second duration DR2 having the second light emission time (e.g., OT2 in FIG. 8B) greater than the first light emission time (e.g., OT1 in FIG. 8B). The bias voltage VBIAS in the second duration DR2 may be greater than the bias voltage VBIAS in the first duration DR1.

As explained above referring to FIG. 8B, the light emission time control driving may be performed to increase the light emission time in the later portion (e.g., HL5 to HL7) of the low frequency frame. However, when the light emission time is increased in the later portion (e.g., HL5 to HL7) of the low frequency frame, the luminance increase in the first low frequency frame FR1 compared to the high frequency frame may be more severe.

Thus, the bias voltage VBIAS of the second duration DR2 which has the longer light emission time may be set to be greater than the bias voltage VBIAS of the first duration DR1 which has the shorter light emission time so that the luminance difference of the display panel 100 in the low grayscale range may be reduced.

In the present embodiment, the bias voltage VBIAS may gradually increase toward a first target value TF11 in the first duration DR1. The bias voltage VBIAS may gradually increase toward a second target value TF12 greater than the first target value TF11 in the second duration DR2.

In addition, when the driving frequency of the display panel 100 is changed from the high driving frequency to the low driving frequency, the bias voltage VBIAS of a second low frequency frame FR2 having the low driving frequency may be set to be less than the bias voltage VBIAS of the first low frequency frame FR1 and be equal to or greater than the bias voltage VBIAS of the high frequency frame (the period prior to FR1) having the high driving frequency.

In addition, the second low frequency frame FR2 may include a third duration DR1 having the first light emission time (e.g., OT1 in FIG. 8B) and a fourth duration DR2 having the second light emission time (e.g., OT2 in FIG. 8B) greater than the first light emission time (e.g., OT1 in FIG. 8B). The bias voltage VBIAS in the fourth duration DR2 may be greater than the bias voltage VBIAS in the third duration DR1.

In the present embodiment, the bias voltage VBIAS may gradually increase toward a third target value TF21 in the third duration DR1. The bias voltage VBIAS may gradually increase toward a fourth target value TF22 greater than the third target value TF21 in the fourth duration DR2.

Figure 10A:
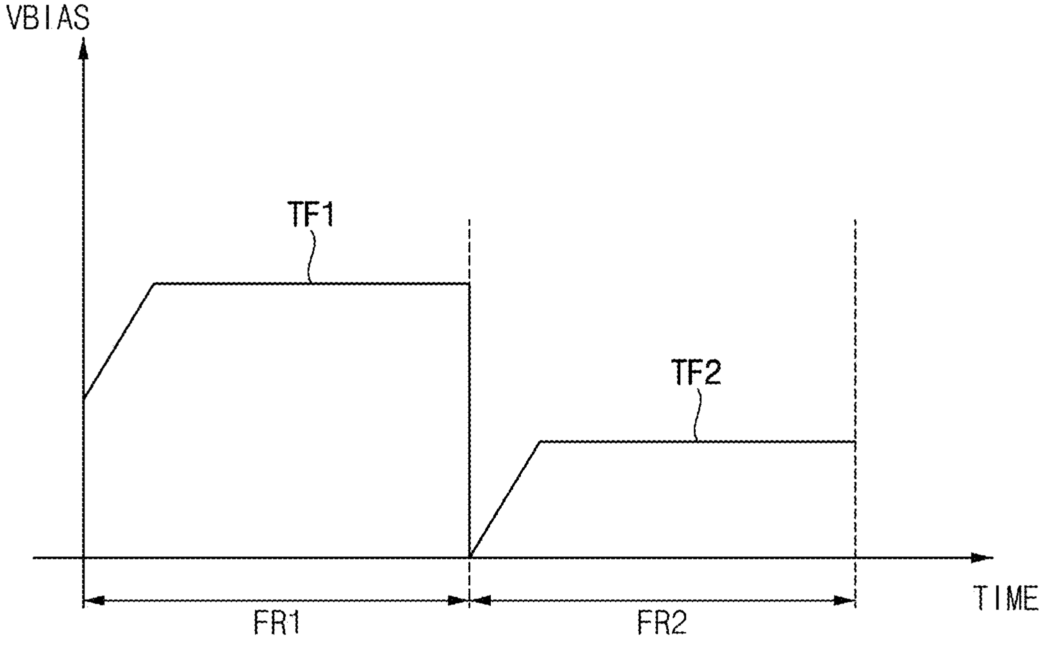
FIG. 10A is a timing diagram illustrating an example of the bias voltage applied to the pixel of FIG. 3 when the light emission time control driving is not performed.
Figure 10B:
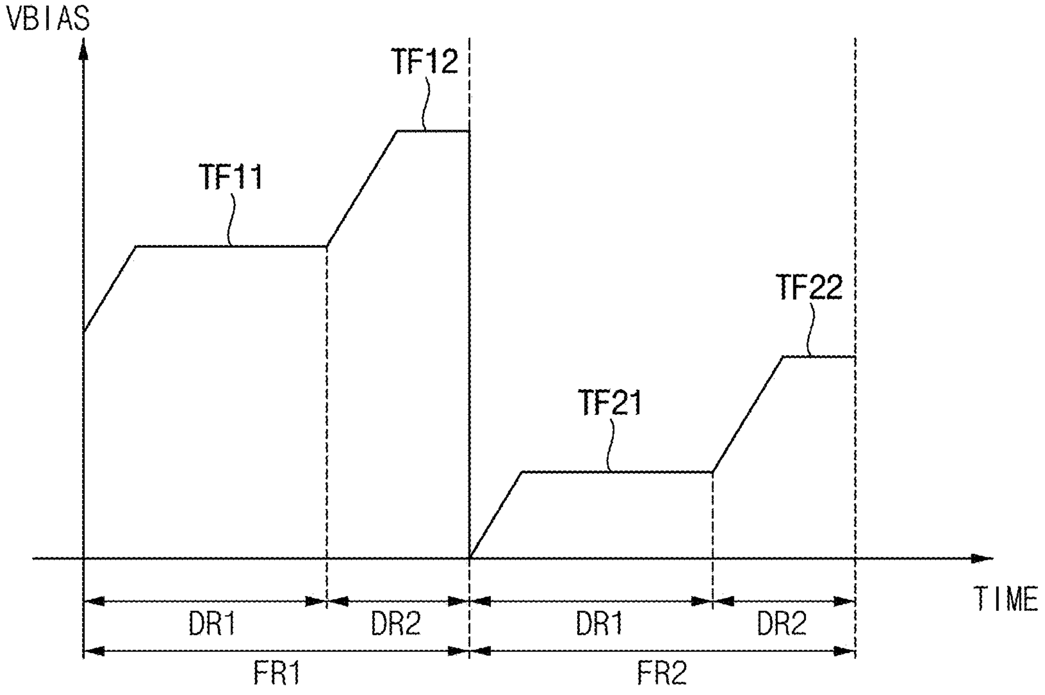
FIG. 10B is a timing diagram illustrating an example of the bias voltage applied to the pixel of FIG. 3 when the light emission time control driving is performed.

FIG. 10A is a timing diagram illustrating an example of the bias voltage VBIAS applied to the pixel of FIG. 3 when the light emission time control driving is not performed. FIG. 10B is a timing diagram illustrating an example of the bias voltage VBIAS applied to the pixel of FIG. 3 when the light emission time control driving is performed.

Embodiments of FIGS. 9A and 9B represent cases in which a difference between the high driving frequency and the low driving frequency is relatively great when the driving frequency of the display panel 100 is changed from the high driving frequency to the low driving frequency. In contrast, embodiments of FIGS. 10A and 10B represent cases in which a difference between the high driving frequency and the low driving frequency is relatively small when the driving frequency of the display panel 100 is changed from the high driving frequency to the low driving frequency. For example, in the embodiments of FIGS. 9A and 9B, the driving frequency may be changed from 240 Hz to 30 Hz. For example, in the embodiments of FIGS. 10A and 10B, the driving frequency may be changed from 120 Hz to 30 Hz.

When the difference between the high driving frequency and the low driving frequency is relatively great, the difference between the bias voltage VBIAS in the first low frequency frame FR1 and the bias voltage VBIAS in the high frequency frame (the period prior to FR1) may be relatively great. Thus, the level of the bias voltage VBIAS in the embodiments of FIGS. 9A and 9B may be generally greater than the level of the bias voltage VBIAS in the embodiments of FIGS. 10A and 10B.

Figure 11A:
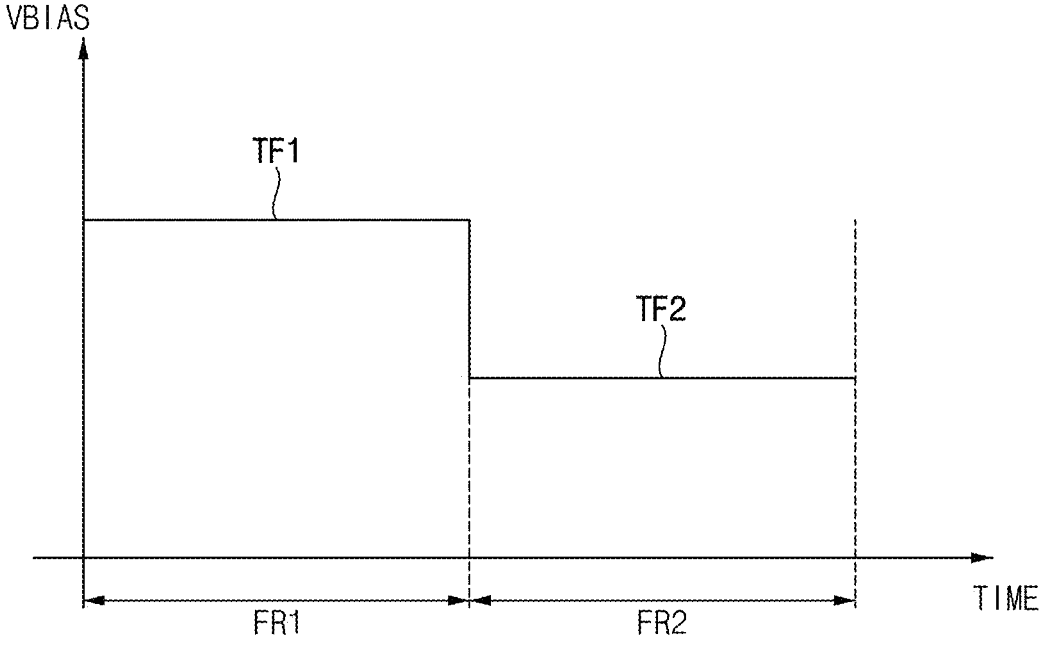
FIG. 11A is a timing diagram illustrating an example of the bias voltage applied to the pixel of FIG. 3 when the light emission time control driving is not performed.
Figure 11B:
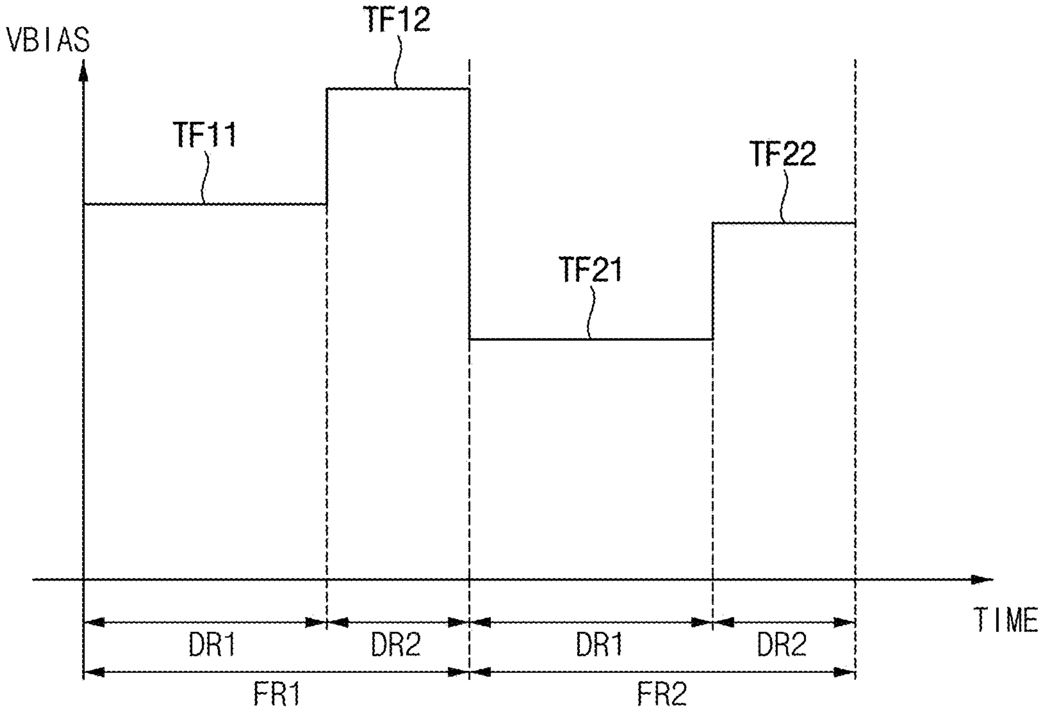
FIG. 11B is a timing diagram illustrating an example of the bias voltage applied to the pixel of FIG. 3 when the light emission time control driving is performed.

FIG. 11A is a timing diagram illustrating an example of the bias voltage VBIAS applied to the pixel of FIG. 3 when the light emission time control driving is not performed. FIG. 11B is a timing diagram illustrating an example of the bias voltage VBIAS applied to the pixel of FIG. 3 when the light emission time control driving is performed.

A waveform of the bias voltage VBIAS in FIG. 11A is substantially the same as the waveform of the bias voltage VBIAS in FIG. 9A except that the waveform of the bias voltage VBIAS does not gradually increase in a frame but instantaneously increases, so that a repetitive explanation may be omitted.

A waveform of the bias voltage VBIAS in FIG. 11B is substantially the same as the waveform of the bias voltage VBIAS in FIG. 9B except that the waveform of the bias voltage VBIAS does not gradually increase in the first duration and in the second duration but instantaneously increases, so that a repetitive explanation may be omitted.

Figure 12A:
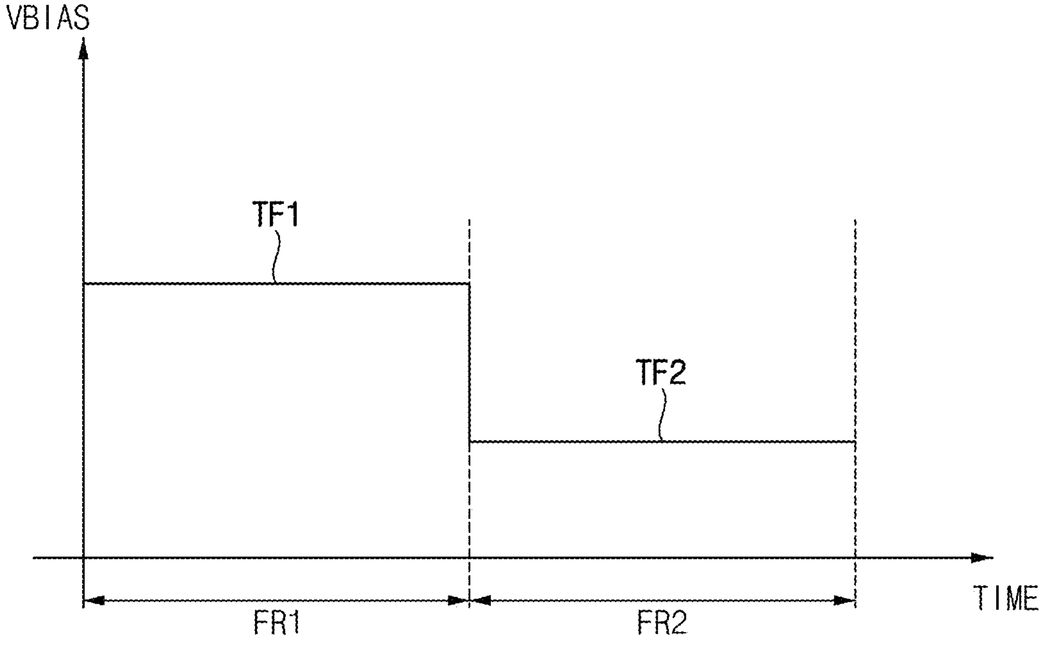
FIG. 12A is a timing diagram illustrating an example of the bias voltage applied to the pixel of FIG. 3 when the light emission time control driving is not performed.
Figure 12B:
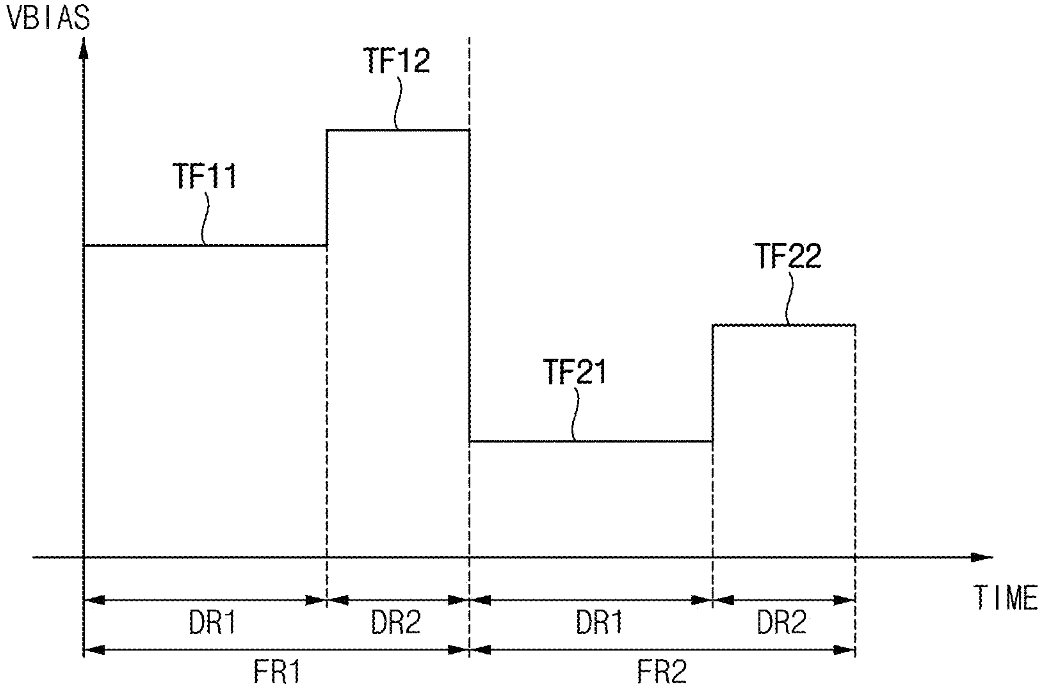
FIG. 12B is a timing diagram illustrating an example of the bias voltage applied to the pixel of FIG. 3 when the light emission time control driving is performed.

FIG. 12A is a timing diagram illustrating an example of the bias voltage VBIAS applied to the pixel of FIG. 3 when the light emission time control driving is not performed. FIG. 12B is a timing diagram illustrating an example of the bias voltage VBIAS applied to the pixel of FIG. 3 when the light emission time control driving is performed.

A waveform of the bias voltage VBIAS in FIG. 12A is substantially the same as the waveform of the bias voltage VBIAS in FIG. 10A except that the waveform of the bias voltage VBIAS does not gradually increase in a frame but instantaneously increases, so that a repetitive explanation may be omitted.

A waveform of the bias voltage VBIAS in FIG. 12B is substantially the same as the waveform of the bias voltage VBIAS in FIG. 10B except that the waveform of the bias voltage VBIAS does not gradually increase in the first duration and in the second duration but instantaneously increases, so that a repetitive explanation may be omitted.

Figure 13:
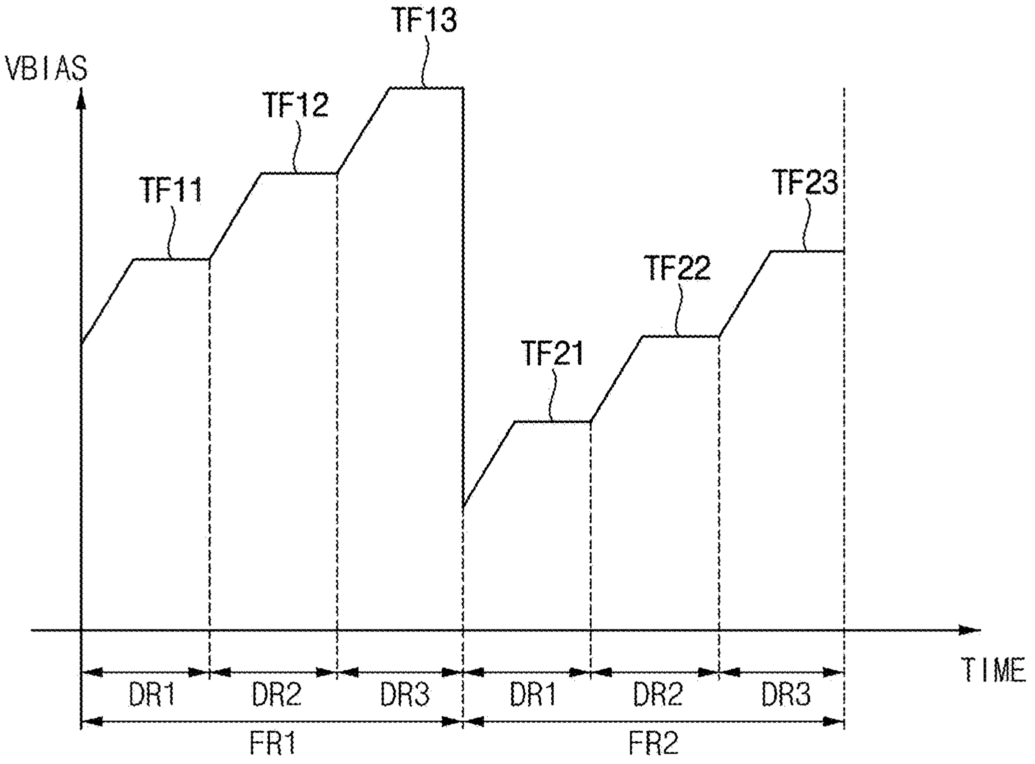
FIG. 13 is a timing diagram illustrating an example of the bias voltage applied to the pixel of FIG. 3 when the light emission time control driving is performed.
Figure 14:
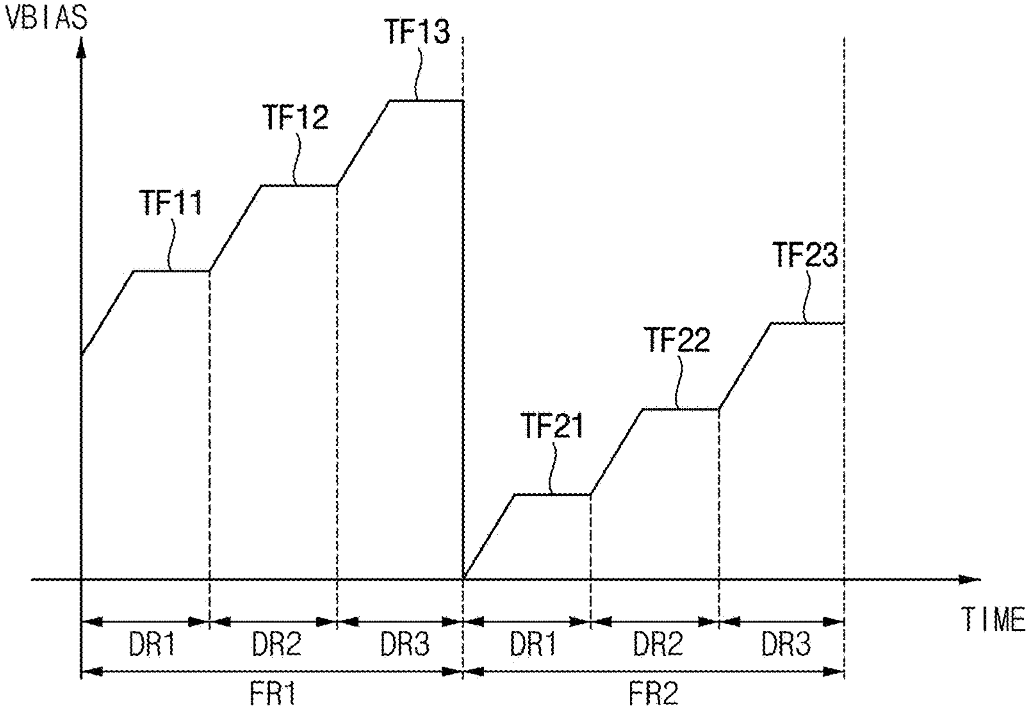
FIG. 14 is a timing diagram illustrating an example of the bias voltage applied to the pixel of FIG. 3 when the light emission time control driving is performed.

FIG. 13 is a timing diagram illustrating an example of the bias voltage VBIAS applied to the pixel of FIG. 3 when the light emission time control driving is performed. FIG. 14 is a timing diagram illustrating an example of the bias voltage VBIAS applied to the pixel of FIG. 3 when the light emission time control driving is performed.

In FIG. 13, the first low frequency frame FR1 may include a first duration DR1 having the first light emission time (e.g., OT1 in FIG. 8B), a second duration DR2 having the second light emission time (e.g., OT2 in FIG. 8B) greater than the first light emission time (e.g., OT1 in FIG. 8B) and a third duration DR3 having a third light emission time greater than the second light emission time (e.g., OT2 in FIG. 8B).

In FIG. 13, the bias voltage VBIAS in the third duration DR3 may be set to be greater than the bias voltage VBIAS in the second duration DR2 and the bias voltage VBIAS in the second duration DR2 may be set to be greater than the bias voltage VBIAS in the first duration DR1.

In FIG. 14, the first low frequency frame FR1 may include a first duration DR1 having the first light emission time (e.g., OT1 in FIG. 8B), a second duration DR2 having the second light emission time (e.g., OT2 in FIG. 8B) greater than the first light emission time (e.g., OT1 in FIG. 8B) and a third duration DR3 having a third light emission time greater than the second light emission time (e.g., OT2 in FIG. 8B).

In FIG. 14, the bias voltage VBIAS in the third duration DR3 may be set to be greater than the bias voltage VBIAS in the second duration DR2 and the bias voltage VBIAS in the second duration DR2 may be set to be greater than the bias voltage VBIAS in the first duration DR1.

An embodiment of FIG. 13 represents a case in which a difference between the high driving frequency and the low driving frequency is relatively great when the driving frequency of the display panel 100 is changed from the high driving frequency to the low driving frequency. In contrast, an embodiment of FIG. 14 represents a case in which a difference between the high driving frequency and the low driving frequency is relatively small when the driving frequency of the display panel 100 is changed from the high driving frequency to the low driving frequency.

When the difference between the high driving frequency and the low driving frequency is relatively great, the difference between the bias voltage VBIAS in the first low frequency frame FR1 and the bias voltage VBIAS in the high frequency frame (the period prior to FR1) may be relatively great. Thus, the level of the bias voltage VBIAS in the embodiment of FIG. 13 may be generally greater than the level of the bias voltage VBIAS in the embodiment of FIG. 14.

Although the single frame includes three periods DR1, DR2 and DR3 having different light emission times and accordingly the bias voltage VBIAS has three different target values in the single frame in FIGS. 13 and 14, the present inventive concept is not limited thereto. Alternatively, the single frame may include four periods having different light emission times and accordingly the bias voltage VBIAS may have four different target values in the single frame.

According to the present embodiment, the driving controller 200 increases the level of the bias voltage VBIAS when a duration of the light emission time of the pixel increases. Accordingly, when the driving frequency of the display panel 100 is changed from the high driving frequency to the low driving frequency, the luminance difference of the display panel 100 may be reduced. Thus, a flicker perceivable to a user due to the luminance difference may be removed or the flicker may be decreased.

In addition, when the holding period HL is maintained in the low frequency driving, the luminance of the display panel 100 may decrease especially in the high grayscale range. To compensate for the luminance decrease of the display panel 100, the light emission time control driving may be performed to increase a duration of the light emission time in a later portion of the low frequency frame. The level of the bias voltage VBIAS may be increased when the duration of the light emission time of the pixel is increased. Accordingly, when the driving frequency of the display panel 100 is changed from the high driving frequency to the low driving frequency, the luminance difference of the display panel 100 may be reduced in the low grayscale range. Therefore, the display quality of the display panel 100 may be increased.

Figure 15:
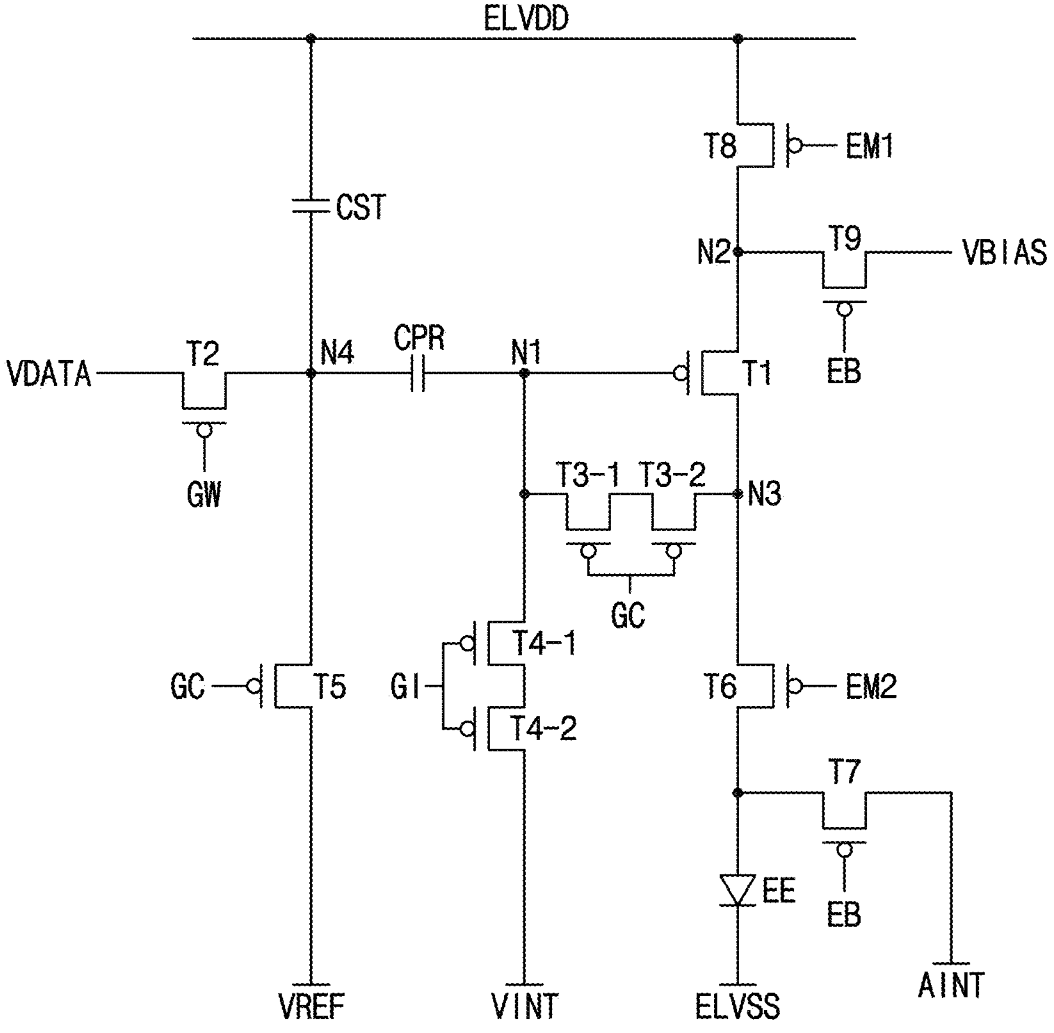
FIG. 15 is a circuit diagram illustrating a pixel of a display panel according to an embodiment of the present inventive concept.

FIG. 15 is a circuit diagram illustrating a pixel of a display panel 100 according to an embodiment of the present inventive concept.

The display apparatus according to the present embodiment is substantially the same as the display apparatus of the previous embodiment explained referring to FIGS. 1 to 14 except for the pixel circuit of the display panel 100. Thus, the same reference numerals will be used to refer to the same or like parts as those described in the previous embodiment of FIGS. 1 to 14 and any repetitive explanation concerning the above elements will be omitted.

In FIG. 15, the pixel may include a first compensation switching element T3-1 and T3-2 connected to the control electrode N1 of the driving switching element T1 and the second electrode N3 of the driving switching element T1.

In the present embodiment, the first compensation switching element T3-1 and T3-2 may include two transistors T3-1 and T3-2 connected to each other in series. For example, the first compensation switching element may include a first compensation transistor T3-1 including a control electrode receiving the compensation gate signal GC, a first electrode connected to the control electrode N1 of the driving switching element T1 and a second electrode connected to a first intermediate node and a second compensation transistor T3-2 including a control electrode receiving the compensation gate signal GC, a first electrode connected to the first intermediate node and a second electrode connected to the second electrode N3 of the driving switching element T1.

When the first compensation switching element includes two transistors T3-1 and T3-2 connected to each other in series, the level of the data voltage VDATA applied to the control electrode N1 of the driving switching element T1 and stored in a storage capacitor CST may be prevented from decreasing due to a current leakage.

The pixel may include a data initialization switching element T4-1 and T4-2 connected to the control electrode N1 of the driving switching element T1 and applying the initialization voltage VINT to the control electrode N1 of the driving switching element T1.

In the present embodiment, the data initialization switching element may include two transistors T4-1 and T4-2 connected to each other in series. For example, the data initialization switching element may include a first data initialization transistor T4-1 including a control electrode receiving the data initialization gate signal GI, a first electrode connected to a second intermediate node and a second electrode connected to the control electrode N1 of the driving switching element T1 and a second data initialization transistor T4-2 including a control electrode receiving the data initialization gate signal GI, a first electrode receiving the initialization voltage VINT and a second electrode connected to the second intermediate node.

When the data initialization switching element includes two transistors T4-1 and T4-2 connected to each other in series, the level of the data voltage VDATA applied to the control electrode N1 of the driving switching element T1 and stored in the storage capacitor CST may be prevented from decreasing due to a current leakage.

According to the present embodiment, the driving controller 200 may increase the level of the bias voltage VBIAS when a duration of the light emission time of the pixel is increased. Accordingly, when the driving frequency of the display panel 100 is changed from the high driving frequency to the low driving frequency, the luminance difference of the display panel 100 may be reduced. Thus, a flicker perceivable to a user due to the luminance difference may be removed or the flicker may be reduced.

In addition, when the holding period HL is maintained in the low frequency driving, the luminance of the display panel 100 may decrease especially in the high grayscale range. To compensate for the luminance decrease of the display panel 100, the light emission time control driving may be performed to increase a duration of the light emission time in a later portion of the low frequency frame. In an embodiment, the level of the bias voltage VBIAS is increased when the duration of the light emission time of the pixel is increased. Accordingly, when the driving frequency of the display panel 100 is changed from the high driving frequency to the low driving frequency, the luminance difference of the display panel 100 may be reduced in the low grayscale range. Therefore, the display quality of the display panel 100 may be increased.

Figure 16:
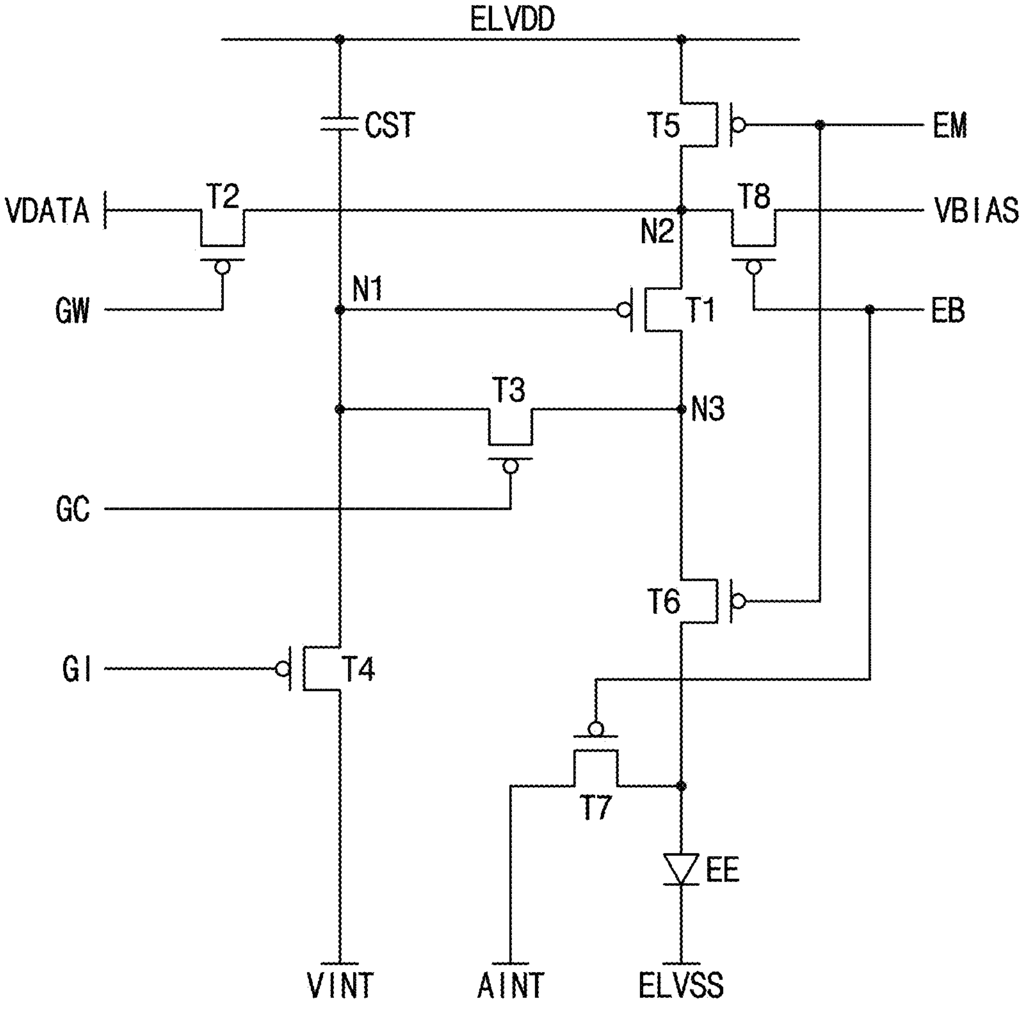
FIG. 16 is a circuit diagram illustrating a pixel of a display panel according to an embodiment of the present inventive concept.
Figure 17:
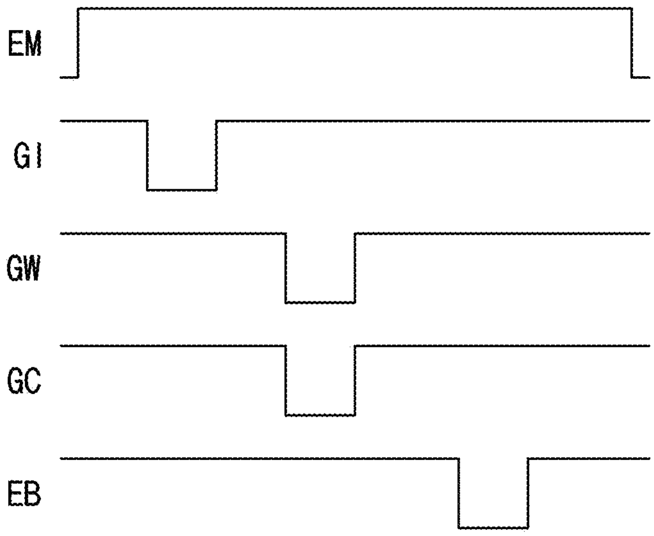
FIG. 17 is a timing diagram illustrating an example of input signals applied to the display panel of FIG. 16 in the writing period.
Figure 18:
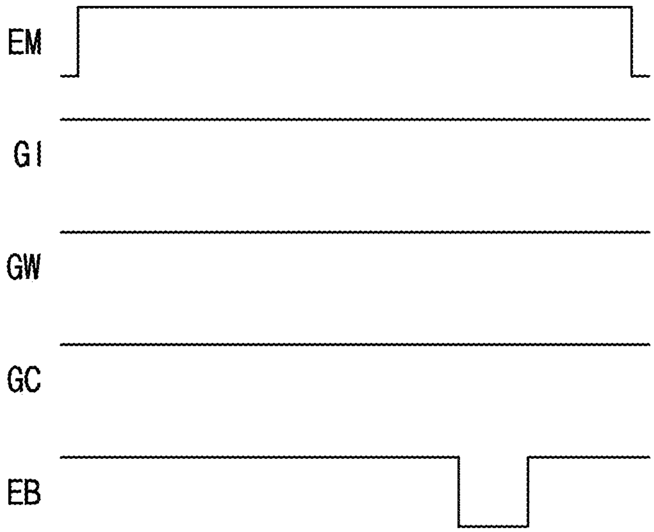
FIG. 18 is a timing diagram illustrating an example of the input signals applied to the display panel of FIG. 16 in the holding period.

FIG. 16 is a circuit diagram illustrating a pixel of a display panel 100 according to an embodiment of the present inventive concept. FIG. 17 is a timing diagram illustrating an example of input signals applied to the display panel 100 of FIG. 16 in the writing period. FIG. 18 is a timing diagram illustrating an example of the input signals applied to the display panel 100 of FIG. 16 in the holding period.

The display apparatus according to the present embodiment is substantially the same as the display apparatus of the previous embodiment explained referring to FIGS. 1 to 14 except for the pixel circuit of the display panel 100 and the input signals. Thus, the same reference numerals will be used to refer to the same or like parts as those described in the previous embodiment of FIGS. 1 to 14 and any repetitive explanation concerning the above elements will be omitted.

Referring to FIGS. 16 to 18, the pixel may include a light emitting element EE, a driving switching element T1 applying a driving current to the light emitting element EE and a bias switching element T9 applying a bias voltage VBIAS to the driving switching element T1. In an embodiment, when a duration of a light emission time of the pixel is increased, a level of the bias voltage VBIAS is increased.

The pixel may include the driving switching element T1 including a control electrode connected to a first node N1, a first electrode connected to a second node N2 and a second electrode connected to a third node N3, the bias switching element T8 including a control electrode receiving a bias gate signal EB, a first electrode receiving the bias voltage VBIAS and a second electrode connected to the second node N2, a first emission switching element T5 including a control electrode receiving the emission signal EM, a first electrode receiving a high power voltage ELVDD and a second electrode connected to the second node N2, a second emission switching element T6 including a control electrode receiving the emission signal EM, a first electrode connected to the third node N3 and a second electrode connected to a first electrode of the light emitting element EE, a data writing switching element T2 including a control electrode receiving a data writing gate signal GW, a first electrode receiving the data voltage VDATA and a second electrode connected to the second node N2, a compensation switching element T3 including a control electrode receiving a compensation gate signal GC, a first electrode connected to the first node N1 and a second electrode connected to the third node N3, a data initialization switching element T4 including a control electrode receiving a data initialization gate signal GI, a first electrode receiving an initialization voltage VINT and a second electrode connected to the first node N1 and a light emitting element initialization switching element T7 including a control electrode receiving the bias gate signal EB, a first electrode receiving a light emitting element initialization voltage AINT and a second electrode connected to the first electrode of the light emitting element EE.

The pixel may further include a first capacitor CST including a first electrode receiving the high power voltage ELVDD and a second electrode connected to the first node N1. The first capacitor CST may maintain the level of the data voltage VDATA applied to the control electrode N1 of the driving switching element T1.

A low power voltage ELVSS may be applied to the light emitting element EE.

In FIG. 17, the data initialization gate signal GI may have an active pulse, the data writing gate signal GW may have an active pulse, the compensation gate signal GC may have an active pulse and the bias gate signal EB may have an active pulse in the writing period WR of FIG. 17. Herein, the active pulses may be pulses of a low level.

When the gate initialization gate signal GI has the active pulse, the data initialization switching element T4 may be turned on so that the initialization voltage VINT may be applied to the control electrode N1 of the driving switching element T1.

When the data writing gate signal GW and the compensation gate signal GC have the active pulses, the data writing switching element T2 and the compensation switching element T3 may be turned on so that the data voltage VDATA which the threshold voltage of the driving switching element T1 is compensated may be applied to the control electrode N1 of the driving switching element T1.

When the bias gate signal EB has the active pulse, the light emitting element initialization switching element T7 may be turned on so that the light emitting element initialization voltage AINT may be applied to the first electrode of the light emitting element EE. In addition, when the bias gate signal EB has the active pulse, the bias switching element T8 may be turned on so that the bias voltage VBIAS may be applied to the first electrode N2 of the driving switching element T1.

In an embodiment, the data initialization gate signal GI does not have an active pulse but maintains an inactive level, the data writing gate signal GW does not have an active pulse but maintains an inactive level, the compensation gate signal GC does not have an active pulse but maintain an inactive level and the bias gate signal EB has an active pulse in the holding period HL of FIG. 18. Herein, the inactive level is a high level and the active pulse may be a pulse of a low level.

In the holding period HL, a data initialization operation by the data initialization switching element T4 and a data writing operation by the data writing switching element T2 and the compensation switching element T3 are not operated or are not performed. In contrast, in the holding period HL, a light emitting element initialization operation by the light emitting element initialization switching element T7 and a bias operation by the bias switching element T9 are operated or performed.

In the writing period WR of FIG. 17, when the data initialization gate signal GI, the data writing gate signal GW, the compensation gate signal GC and the bias gate signal EB has the active pulses, the emission signal EM may have an inactive level.

A waveform of the emission signal EM in the holding period HL of FIG. 18 may be substantially the same as a waveform of the emission signal EM in the writing period WR of FIG. 17.

According to the present embodiment, the driving controller 200 increases the level of the bias voltage VBIAS when the light emission time of the pixel increases. Accordingly, when the driving frequency of the display panel 100 is changed from the high driving frequency to the low driving frequency, the luminance difference of the display panel 100 may be reduced. Thus, a flicker perceivable by a user due to the luminance difference may be removed or the flicker may be reduced.

In addition, when the holding period HL is maintained in the low frequency driving, the luminance of the display panel 100 may decrease especially in the high grayscale range. To compensate for the luminance decrease of the display panel 100, the light emission time control driving may be performed to increase a duration of the light emission time in the later portion of the low frequency frame. The level of the bias voltage VBIAS may be increased when the duration of the light emission time of the pixel is increased. Accordingly, when the driving frequency of the display panel 100 is changed from the high driving frequency to the low driving frequency, the luminance difference of the display panel 100 may be reduced in the low grayscale range. Therefore, the display quality of the display panel 100 may be increased.

Figure 19:
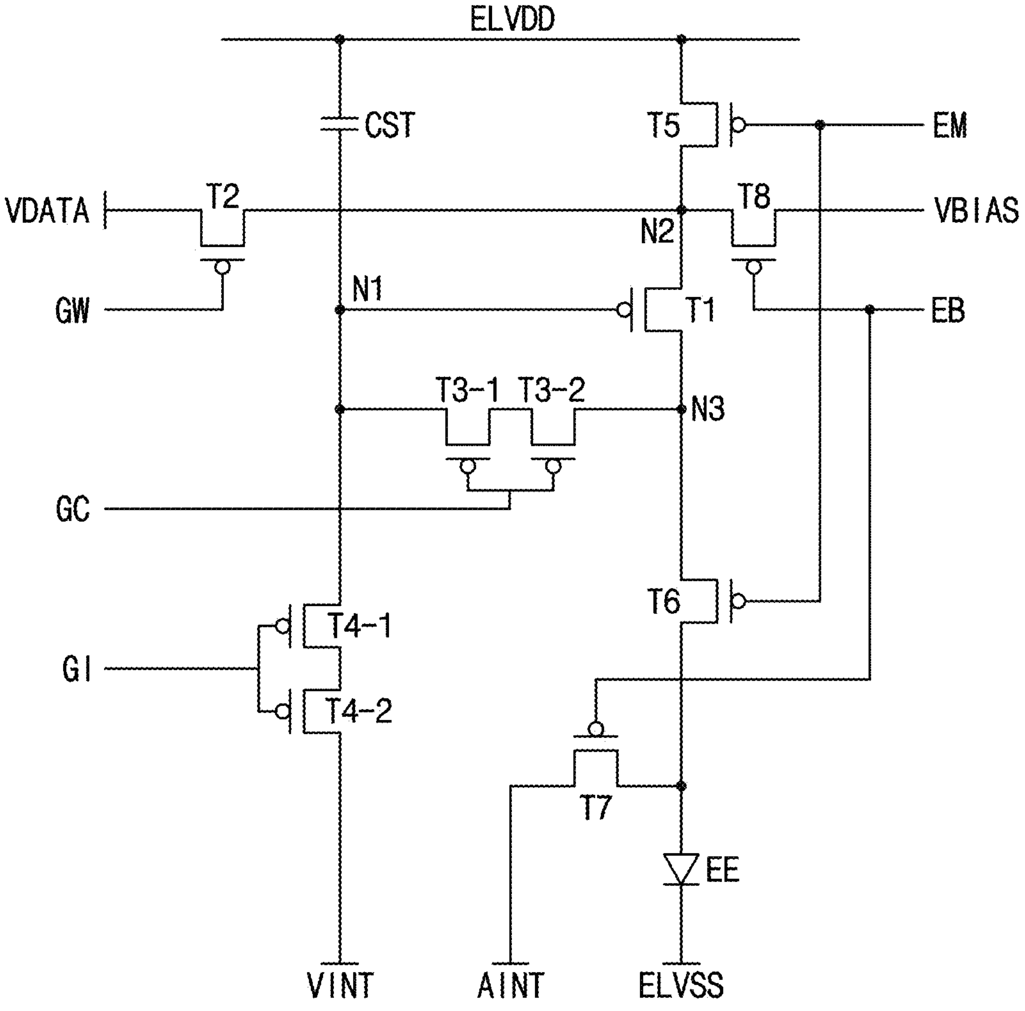
FIG. 19 is a circuit diagram illustrating a pixel of a display panel according to an embodiment of the present inventive concept.

FIG. 19 is a circuit diagram illustrating a pixel of a display panel 100 according to an embodiment of the present inventive concept.

The display apparatus according to the present embodiment is substantially the same as the display apparatus of the previous embodiment explained referring to FIGS. 16 to 18 except for the pixel circuit of the display panel 100. Thus, the same reference numerals will be used to refer to the same or like parts as those described in the previous embodiment of FIGS. 16 to 18 and any repetitive explanation concerning the above elements will be omitted.

In FIG. 19, the pixel may include a first compensation switching element T3-1 and T3-2 connected to the control electrode N1 of the driving switching element T1 and the second electrode N3 of the driving switching element T1.

In the present embodiment, the compensation switching element T3-1 and T3-2 may include two transistors T3-1 and T3-2 connected to each other in series. For example, the compensation switching element may include a first compensation transistor T3-1 including a control electrode receiving the compensation gate signal GC, a first electrode connected to the control electrode N1 of the driving switching element T1 and a second electrode connected to a first intermediate node and a second compensation transistor T3-2 including a control electrode receiving the compensation gate signal GC, a first electrode connected to the first intermediate node and a second electrode connected to the second electrode N3 of the driving switching element T1.

When the compensation switching element includes two transistors T3-1 and T3-2 connected to each other in series, the level of the data voltage VDATA applied to the control electrode N1 of the driving switching element T1 and stored in a storage capacitor CST may be prevented from decreasing due to a current leakage.

The pixel may include a data initialization switching element T4-1 and T4-2 connected to the control electrode N1 of the driving switching element T1 and applying the initialization voltage VINT to the control electrode N1 of the driving switching element T1.

In the present embodiment, the data initialization switching element may include two transistors T4-1 and T4-2 connected to each other in series. For example, the data initialization switching element may include a first data initialization transistor T4-1 including a control electrode receiving the data initialization gate signal GI, a first electrode connected to a second intermediate node and a second electrode connected to the control electrode N1 of the driving switching element T1 and a second data initialization transistor T4-2 including a control electrode receiving the data initialization gate signal GI, a first electrode receiving the initialization voltage VINT and a second electrode connected to the second intermediate node.

When the data initialization switching element includes two transistors T4-1 and T4-2 connected to each other in series, the level of the data voltage VDATA applied to the control electrode N1 of the driving switching element T1 and stored in the storage capacitor CST may be prevented from decreasing due to a current leakage.

According to the present embodiment, the driving controller 200 increases the level of the bias voltage VBIAS when a duration of the light emission time of the pixel is increased. Accordingly, when the driving frequency of the display panel 100 is changed from the high driving frequency to the low driving frequency, the luminance difference of the display panel 100 may be reduced. Thus, a flicker perceivable to a user due to the luminance difference may be removed or the flicker may be reduced.

In addition, when the holding period HL is maintained in the low frequency driving, the luminance of the display panel 100 may decrease especially in the high grayscale range. To compensate for the luminance decrease of the display panel 100, the light emission time control driving may be performed to increase the duration of the light emission time in the later portion of the low frequency frame. The level of the bias voltage VBIAS may be increased when the light emission time of the pixel is increased. Accordingly, when the driving frequency of the display panel 100 is changed from the high driving frequency to the low driving frequency, the luminance difference of the display panel 100 may be reduced in the low grayscale range. Therefore, the display quality of the display panel 100 may be enhanced.

Figure 20:
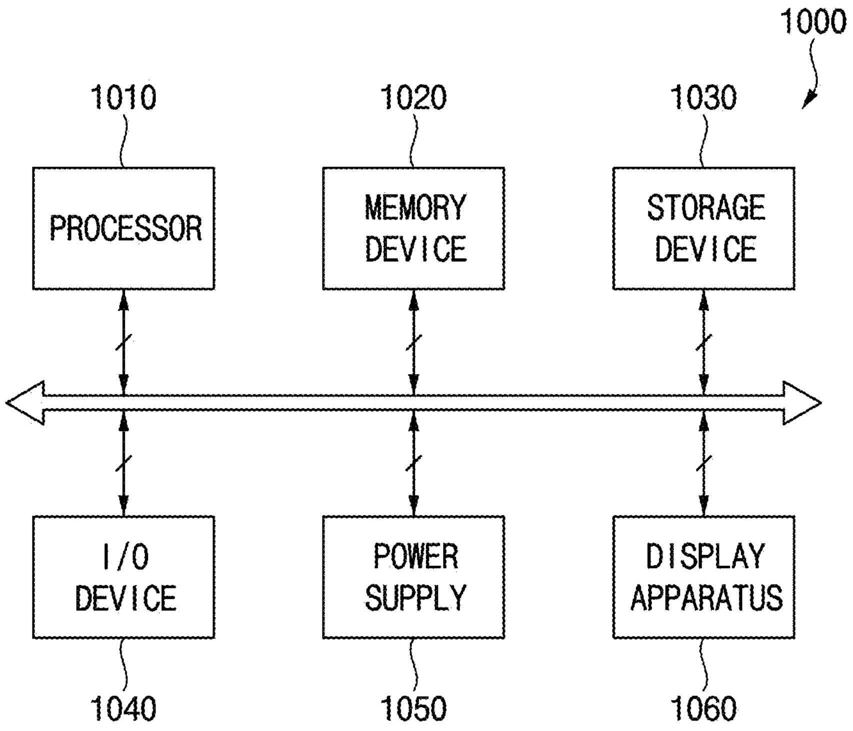
FIG. 20 is a block diagram illustrating an electronic apparatus according to an embodiment of the present inventive concept.
Figure 21:
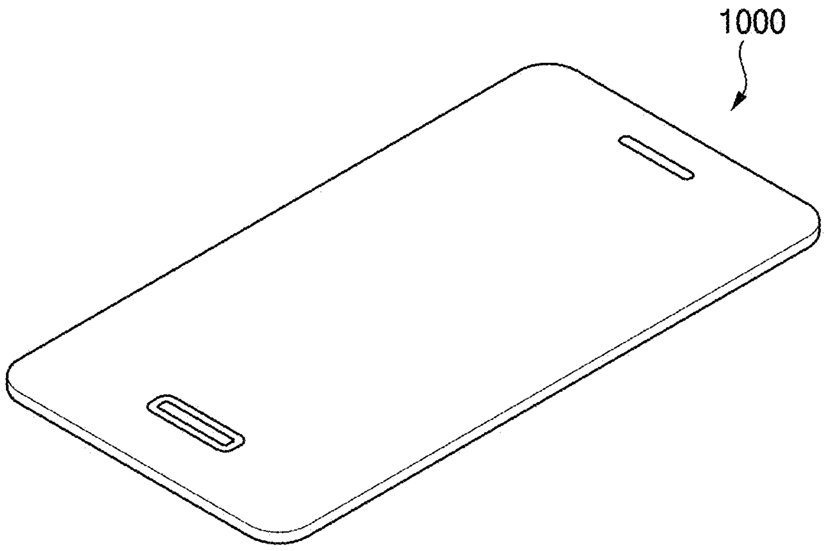
FIG. 21 is a diagram illustrating an example in which the electronic apparatus of FIG. 20 is implemented as a smart phone.

FIG. 20 is a block diagram illustrating an electronic apparatus according to an embodiment of the present inventive concept. FIG. 21 is a diagram illustrating an example in which the electronic apparatus of FIG. 20 is implemented as a smart phone.

Referring to FIGS. 20 and 21, the electronic apparatus 1000 may include a processor 1010, a memory device 1020, a storage device 1030, an input/output (I/O) device 1040, a power supply 1050, and a display apparatus 1060. Here, the display apparatus 1060 may be the display apparatus of FIG. 1. In addition, the electronic apparatus 1000 may further include a plurality of ports for communicating with a video card, a sound card, a memory card, a universal serial bus (USB) device, other electronic apparatuses, etc.

In an embodiment, as illustrated in FIG. 21, the electronic apparatus 1000 may be implemented as a smart phone. However, the electronic apparatus 1000 is not limited thereto. For example, the electronic apparatus 1000 may be implemented as a cellular phone, a video phone, a smart pad, a smart watch, a tablet PC, a car navigation system, a computer monitor, a laptop, a head mounted display (TIMID) device, and the like.

The processor 1010 may perform various computing functions or various tasks. The processor 1010 may be a micro-processor, a central processing unit (CPU), an application processor (AP), and the like. The processor 1010 may be coupled to other components via an address bus, a control bus, a data bus, etc. Further, the processor 1010 may be coupled to an extended bus such as a peripheral component interconnection (PCI) bus.

The processor 1010 may output the input image data IMG and the input control signal CONT to the driving controller 200 of FIG. 1.

The memory device 1020 may store data for operations of the electronic apparatus 1000. For example, the memory device 1020 may include at least one non-volatile memory device such as an erasable programmable read-only memory (EPROM) device, an electrically erasable programmable read-only memory (EEPROM) device, a flash memory device, a phase change random access memory (PRAM) device, a resistance random access memory (RRAM) device, a nano floating gate memory (NFGM) device, a polymer random access memory (PoRAM) device, a magnetic random access memory (MRAM) device, a ferroelectric random access memory (FRAM) device, and the like and/or at least one volatile memory device such as a dynamic random access memory (DRAM) device, a static random access memory (SRAM) device, a mobile DRAM device, and the like.

The storage device 1030 may include a solid state drive (SSD) device, a hard disk drive (HDD) device, a CD-ROM device, and the like. The I/O device 1040 may include an input device such as a keyboard, a keypad, a mouse device, a touch-pad, a touch-screen, and the like and an output device such as a printer, a speaker, and the like. In some embodiments, the display apparatus 1060 may be included in the I/O device 1040. The power supply 1050 may provide power for operations of the electronic apparatus 1000. The display apparatus 1060 may be coupled to other components via the buses or other communication links. The display apparatus 1060 may be implemented by the display apparatus of FIG. 1.

According to at least one embodiment of the display apparatus, the display quality a display panel of the display apparatus may be increased.

The foregoing is illustrative of the present inventive concept and is not to be construed as limiting thereof. Although a few embodiments of the present inventive concept have been described, those skilled in the art will readily appreciate that many modifications are possible in the embodiments without materially departing from the novel teachings and advantages of the present inventive concept. Accordingly, all such modifications are intended to be included within the scope of the present inventive concept as defined in the claims.

What is claimed is:

1. A display apparatus comprising:
- a display panel including a pixel;
- a gate driver configured to output a gate signal to the pixel;
- a data driver configured to output a data voltage to the pixel; and
- an emission driver configured to output an emission signal to the pixel, wherein the pixel comprises:
  - a light emitting element;
  - a driving switching element configured to apply a driving current to the light emitting element; and
  - a bias switching element configured to apply a bias voltage to the driving switching element,
  - wherein a first duration of a given frame has a first light emission time greater than zero and a second duration of the given frame has a second light emission time greater than the first light emission time, and wherein a level of the bias voltage in the second duration of the given frame is greater than a level of the bias voltage in the first duration of the given frame.

2. The display apparatus of claim 1, wherein when a driving frequency of the display panel is changed from a high driving frequency to a low driving frequency, the bias voltage of a first low frequency frame having the low driving frequency is equal to or greater than the bias voltage of a high frequency frame having the high driving frequency.

3. The display apparatus of claim 2, wherein the first low frequency frame includes the first duration having the first light emission time and the second duration having the second light emission time.

4. The display apparatus of claim 3, wherein the display apparatus gradually increases the bias voltage toward a first target value in the first duration.

5. The display apparatus of claim 4, wherein the display apparatus gradually increases the bias voltage toward a second target value greater than the first target value in the second duration.

6. The display apparatus of claim 2, wherein when the driving frequency of the display panel is changed from the high driving frequency to the low driving frequency, the bias voltage of a second low frequency frame having the low driving frequency is less than the bias voltage of the first low frequency frame and equal to or greater than the bias voltage of the high frequency frame.

7. The display apparatus of claim 6, wherein the second low frequency frame includes a third duration having a third light emission time and a fourth duration having a fourth light emission time greater than the third light emission time, and wherein the bias voltage in the fourth duration is greater than the bias voltage in the third duration.

8. The display apparatus of claim 7, wherein the display apparatus gradually increases the bias voltage toward a second target value in the third duration.

9. The display apparatus of claim 8, wherein the display apparatus gradually increases the bias voltage toward a third target value greater than the second target value in the fourth duration.

10. The display apparatus of claim 2, wherein when the driving frequency of the display panel is changed from the high driving frequency to the low driving frequency and a difference between the high driving frequency and the low driving frequency is greater than a first threshold, a difference between the bias voltage in the first low frequency frame and the bias voltage in the high frequency frame is greater than a second threshold.

11. The display apparatus of claim 2, wherein the first low frequency frame includes the first duration having the first light emission time, the second duration having the second light emission time and a third duration having a third light emission time greater than the second light emission time, and wherein the bias voltage in the third duration is greater than the bias voltage in the second duration and the bias voltage in the second duration is greater than the bias voltage in the first duration.

12. The display apparatus of claim 1, wherein the driving switching element includes a control electrode connected to a first node, a first electrode connected to a second node and a second electrode connected to a third node, and wherein the bias switching element includes a control electrode configured to receive a bias gate signal, a first electrode configured to receive the bias voltage and a second electrode connected to the second node.

13. The display apparatus of claim 12, wherein the pixel further comprises: a first emission switching element including a control electrode configured to receive a first emission signal, an input electrode configured to receive a high power voltage and an output electrode connected to the second node; and a second emission switching element including a control electrode configured to receive a second emission signal, an input electrode connected to the third node and an output electrode connected to a first electrode of the light emitting element.

14. The display apparatus of claim 13, wherein a light emission time of the pixel is determined by a turn-on time of the first emission signal and a turn-on time of the second emission signal.

15. The display apparatus of claim 13, wherein the pixel further comprises:

a data writing switching element including a control electrode configured to receive a data writing gate signal, a first electrode configured to receive the data voltage and a second electrode connected to a fourth node;

a first compensation writing switching element including a control electrode configured to receive a compensation gate signal, a first electrode connected to the first node and a second electrode connected to the third node;

a data initialization switching element including a control electrode configured to receive a data initialization gate signal, a first electrode configured to receive an initialization voltage and a second electrode connected to the first node;

a second compensation switching element including a control electrode configured to receive the compensation gate signal, a first electrode configured to receive a reference voltage and a second electrode connected to the fourth node; and a light emitting element initialization switching element including a control electrode configured to receive the bias gate signal, a first electrode configured to receive a light emitting element initialization voltage and a second electrode connected to the first electrode of the light emitting element.

16. The display apparatus of claim 15, wherein the first compensation writing switching element comprises two transistors connected to each other in series, and wherein the data initialization switching element includes two transistors connected to each other in series.

17. The display apparatus of claim 1, wherein the pixel comprises:

the driving switching element including a control electrode connected to a first node, a first electrode connected to a second node and a second electrode connected to a third node;

the bias switching element including a control electrode configured to receive a bias gate signal, a first electrode configured to receive the bias voltage and a second electrode connected to the second node;

a first emission switching element including a control electrode configured to receive the emission signal, a first electrode configured to receive a high power voltage and a second electrode connected to the second node;

a second emission switching element including a control electrode configured to receive the emission signal, a first electrode connected to the third node and a second electrode connected to a first electrode of the light emitting element;

a data writing switching element including a control electrode configured to receive a data writing gate signal, a first electrode configured to receive the data voltage and a second electrode connected to the second node; a compensation switching element including a control electrode configured to receive a compensation gate signal, a first electrode connected to the first node and a second electrode connected to the third node;

a data initialization switching element including a control electrode configured to receive a data initialization gate signal, a first electrode configured to receive an initialization voltage and a second electrode connected to the first node; and a light emitting element initialization switching element including a control electrode configured to receive the bias gate signal, a first electrode configured to receive a light emitting element initialization voltage and a second electrode connected to the first electrode of the light emitting element.

18. The display apparatus of claim 17, wherein the compensation switching element comprises two transistors connected to each other in series, and wherein the data initialization switching element includes two transistors connected to each other in series.

19. A method of driving a display apparatus, the method comprising:

outputting a gate signal to a pixel of a display panel, wherein the pixel comprises a light emitting element, a driving switching element configured to apply a driving current to the light emitting element and a bias switching element configured to apply a bias voltage to the driving switching element;

outputting a data voltage to the pixel;

outputting an emission signal to the pixel; and adjusting a level of the bias voltage, wherein a first duration of a given frame has a first light emission time greater than zero and a second duration of the given frame has a second light emission time greater than the first light emission time, and wherein the level of the bias voltage in the second duration of the given frame is greater than the level of the bias voltage in the first duration of the given frame.

20. An electronic apparatus comprising:

a display panel including a pixel;

a gate driver configured to output a gate signal to the pixel; a data driver configured to output a data voltage to the pixel;

an emission driver configured to output an emission signal to the pixel; a driving controller configured to control the gate driver, the data driver and the emission driver; and a processor configured to output input image data and an input control signal to the driving controller, wherein the pixel comprises:

a light emitting element; a driving switching element configured to apply a driving current to the light emitting element; and a bias switching element configured to apply a bias voltage to the driving switching element, and wherein a first duration of a given frame has a first light emission time greater than zero and a second duration of the given frame has a second light emission time greater than the first light emission time, and wherein a level of the bias voltage in the second duration of the given frame is greater than a level of the bias voltage in the first duration of the given frame.

* * * * *